US012747408B2

(12) United States Patent
Miller

(10) Patent No.: US 12,747,408 B2
(45) Date of Patent: Sep. 29, 2026

(54) LIQUID COMPOSITIONS CONTAINING DATEM INGREDIENTS FOR PREPARATION OF DETERGENT COMPOSITIONS

(71) Applicant: International N&H Denmark ApS, Kongens Lyngby (DK)

(72) Inventor: Rasmus Leth Miller, Kongens Lyngby (DK)

(73) Assignee: INTERNATIONAL N&H DENMARK APS, Kongens Lyngby (DK)

( * ) Notice: Subject to any disclaimer, the term of this patent is extended or adjusted under 35 U.S.C. 154(b) by 468 days.

(21) Appl. No.: 18/255,924

(22) PCT Filed: Dec. 2, 2021

(86) PCT No.: PCT/EP2021/083984

§ 371 (c)(1),
(2) Date: Jun. 5, 2023

(87) PCT Pub. No.: WO2022/117733

PCT Pub. Date: Jun. 9, 2022

(65) Prior Publication Data

US 2024/0117271 A1 Apr. 11, 2024

Related U.S. Application Data

(60) Provisional application No. 63/121,303, filed on Dec. 4, 2020.

(30) Foreign Application Priority Data

Dec. 4, 2020 (EP) .................................... 20211915

(51) Int. Cl.
*C11D 1/04* (2006.01)
*C11D 3/43* (2006.01)
*C11D 11/00* (2006.01)
*C11D 17/00* (2006.01)

(52) U.S. Cl.
CPC .................. *C11D 1/04* (2013.01); *C11D 3/43* (2013.01); *C11D 11/0094* (2013.01); *C11D 17/0008* (2013.01)

(58) Field of Classification Search
CPC ... C11D 1/04; C11D 11/0094; C11D 17/0008; C11D 2111/12
See application file for complete search history.

(56) References Cited

U.S. PATENT DOCUMENTS

| | | | | |
|---|---|---|---|---|
| 2,236,516 | A | 4/1941 | Cahn et al. | |
| 2,938,027 | A * | 5/1960 | Gladstone | C11C 3/04 536/116 |
| 5,401,518 | A * | 3/1995 | Adams | A23P 20/11 426/89 |
| 5,837,308 | A * | 11/1998 | Campbell | A23L 27/66 426/604 |
| 2012/0058232 | A1 | 3/2012 | Liu et al. | |
| 2016/0073663 | A1* | 3/2016 | Sparsoe | A21D 2/16 426/654 |
| 2019/0193928 | A1* | 6/2019 | Broen | B65D 65/463 |

FOREIGN PATENT DOCUMENTS

| | | | |
|---|---|---|---|
| CA | 2745110 | A1 | 12/2012 |
| CN | 109247559 | A1 | 1/2019 |
| EP | 0251020 | A1 | 7/1988 |
| GB | 1220488 | A1 | 1/1971 |
| GB | 1344518 | A1 | 1/1974 |
| WO | 2003-039261 | A1 | 5/2003 |
| WO | 2014-184079 | A1 | 11/2014 |
| WO | 2020-058088 | A1 | 3/2020 |
| WO | 2020-058090 | A1 | 3/2020 |
| WO | 2020-058096 | A1 | 3/2020 |

OTHER PUBLICATIONS

EPO Search Report for European Appl No. 20211915.2 (Apr. 20, 2021).

FAO JEFCA Mongraphs 1, Combined Compendium of Food Additive Specifications, Joint FAO/WHO Expert Committee on Food Additives, All specifications monographs from the 1st to 65th meeting, vol. 4 (2006).

FAO JEFCA Mongraphs 7, Compendium of Food Additive Specifications, Joint FAO/WHO Expert Committee on Food Additives, 71st Meeting (2009).

International Preliminary Report on Patentability for PCT-EP2021-083984 (issued May 30, 2023).

International Search Report for PCT-EP2021-083984 (mailed Feb. 21, 2022).

Krog, et al., “Food Emulsifiers and Their Associations with Water” in S. Friberg, Food Emulsions, Marcel Dekker, New York, chapter 3, pp. 67-139 (1976).

Krog, “Food Emulsifiers and Their Chemical and Physical Properties,” in S. Friberg, et al., Food Emulsions, Third Edition, Marcel Dekker, New York, chapter 4, pp. 141-188 (1997).

Larsson, Zeitschrift für Physikalische Chemie Neue Folge, vol. 56, pp. 173-198 (1967).

* cited by examiner

*Primary Examiner* — Charles I Boyer

(57) ABSTRACT

The present invention relates to a liquid DATEM composition comprising DATEM rich in DATEM I and/to DATEM II, and a diluent selected from the group consisting of water, glycerol and mixtures thereof. The invention is also related to a process for preparing the composition and the use thereof.

17 Claims, 18 Drawing Sheets

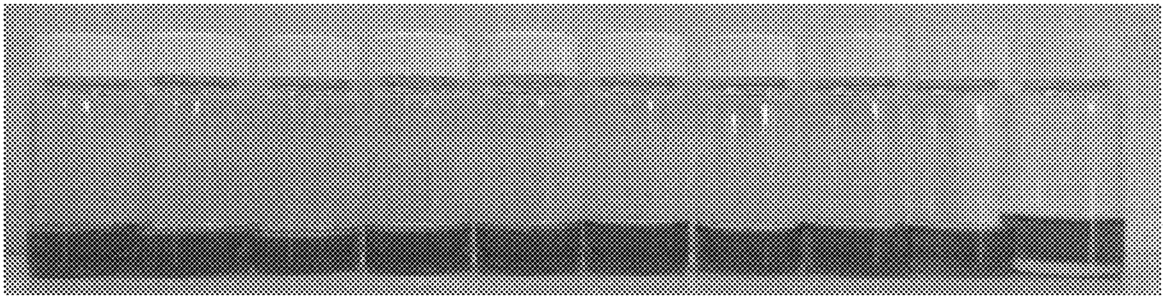

Figure 1: Photos showing visual test of sample 1.1 with glycerol as diluent evaluated at 30°C. Diluent content in samples from left: 9.1w/w%, 16.8w/w%, 23.3w/w%, 28.9w/w%, 33.8w/w%, 38.2w/w%, 42.0w/w%, 45.4w/w% and 48.4w/w%. First identified separation: 48.4w/w%.

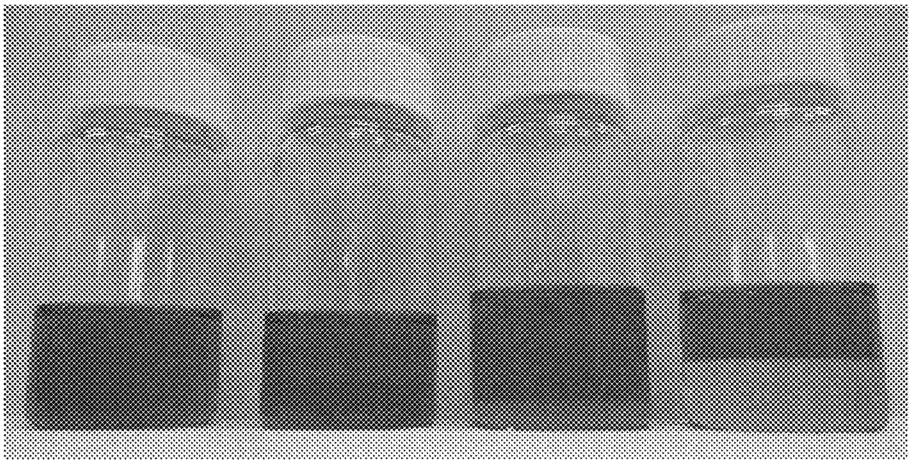

Figure 2: Photos showing visual test of sample 1.2 with glycerol as diluent evaluated at 30°C. Diluent content in samples from left: 58.5w/w%, 61.3w/w%, 69.0w/w% and 74.2w/w%. First identified separation: 69.0w/w%.

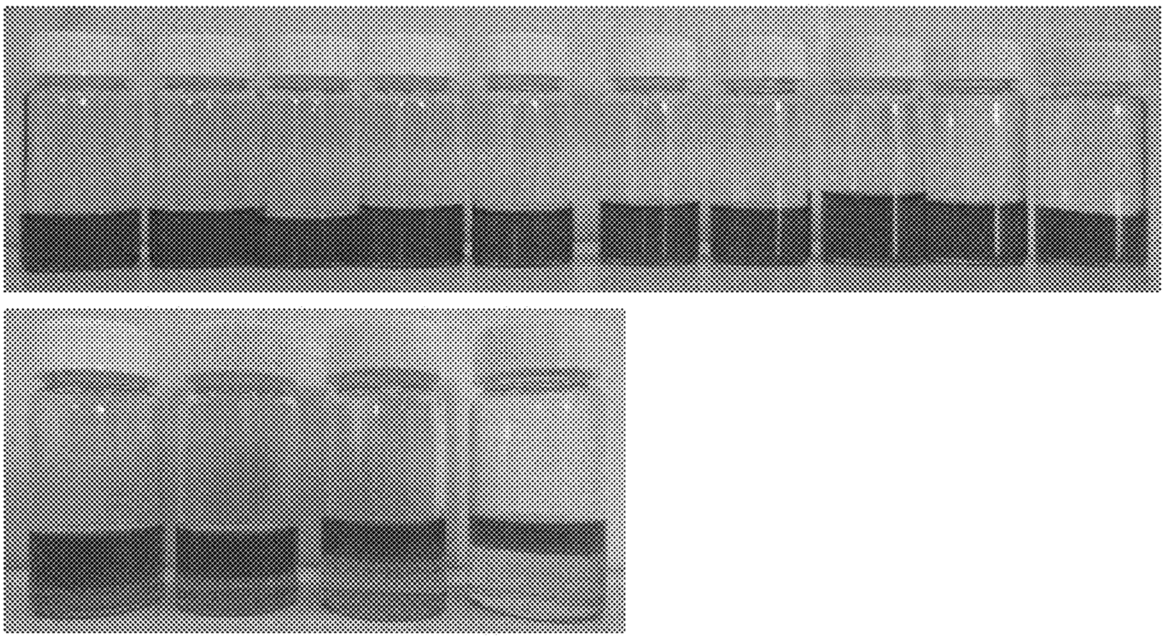
Figure 3: Photos showing visual test of sample 1.3 with water as diluent evaluated at 40°C. Diluent content in samples from left in top row: 9.1w/w%, 16.8w/w%, 23.3w/w%, 28.9w/w%, 33.8w/w%, 38.2w/w%, 42.0w/w%, 45.4w/w% and 48.4w/w%. And from left in bottom row: 58.5w/w%, 61.3w/w%, 69.0w/w% and 74.2w/w%. First identified separation: 58.5w/w%.

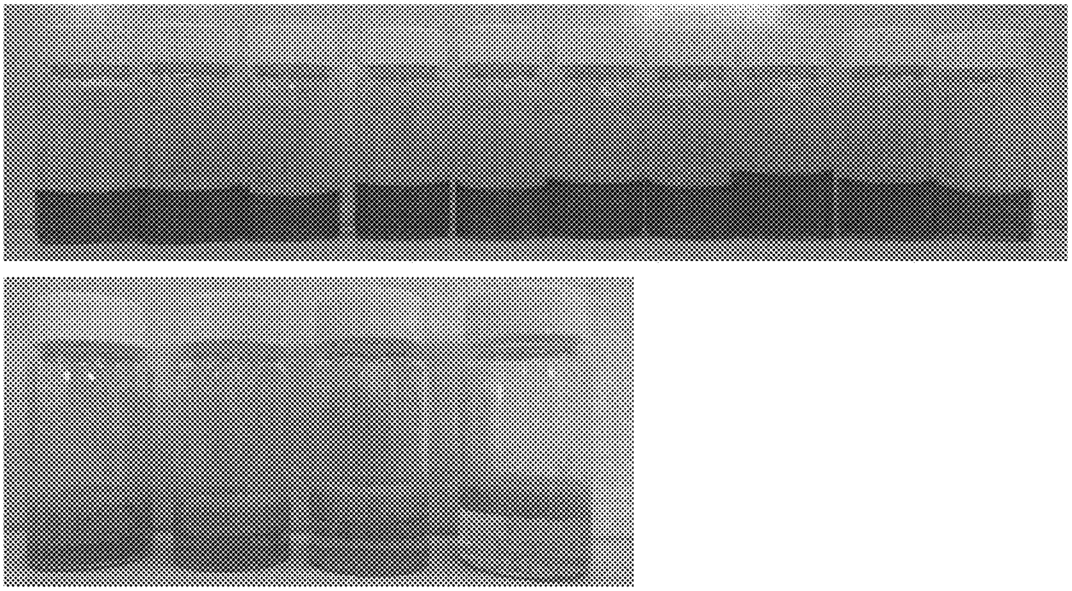

Figure 4: Photos showing visual test of sample 1.3 with water as diluent evaluated at 30°C. Diluent content in samples from left in top row: 9.1w/w%, 16.8w/w%, 23.3w/w%, 28.9w/w%, 33.8w/w%, 38.2w/w%, 42.0w/w%, 45.4w/w% and 48.4w/w%. And from left in bottom row: 58.5w/w%, 61.3w/w%, 69.0w/w% and 74.2w/w%. First identified separation: 58.5w/w%.

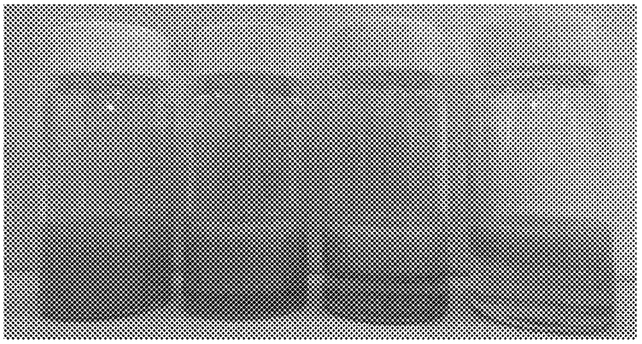

Figure 5: Photos showing visual test of sample 1.5 with water as diluent evaluated at 40°C. Diluent content in samples from left: 58.5w/w%, 61.3w/w%, 69.0w/w% and 74.2w/w%. First identified separation: 61.3w/w%.

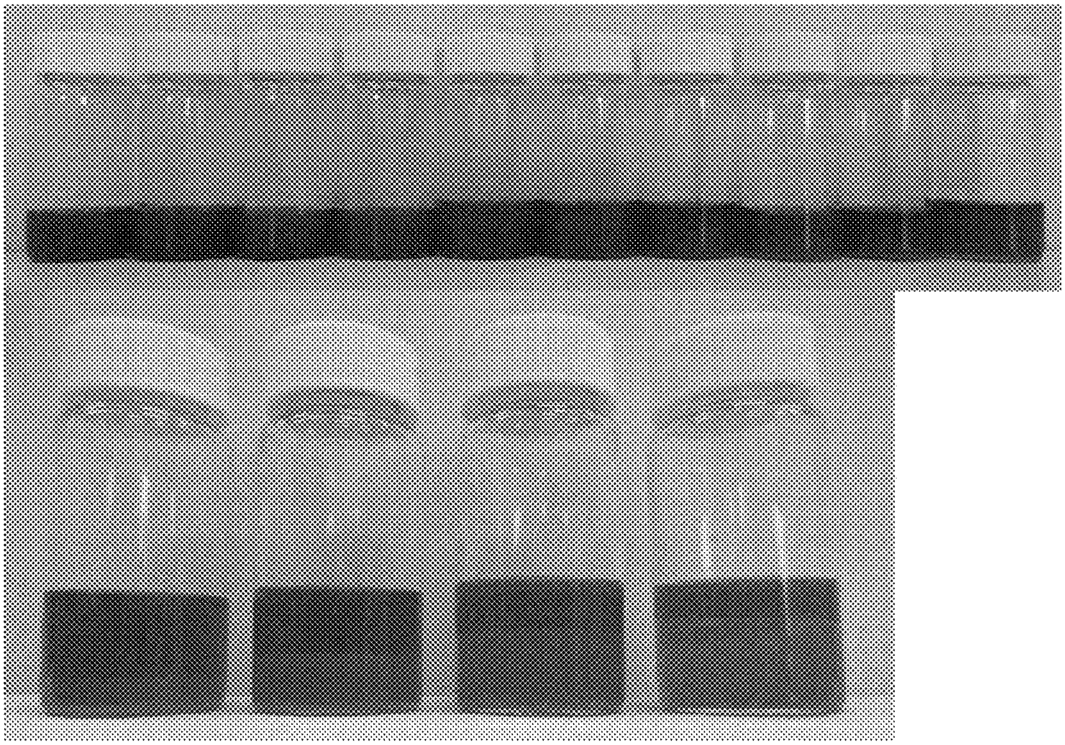

Figure 6: Photos showing visual test of sample 1.6 with water as diluent evaluated at 40°C. Diluent content in samples from left in top row: 9.1w/w%, 16.8w/w%, 23.3w/w%, 28.9w/w%, 33.8w/w%, 38.2w/w%, 42.0w/w%, 45.4w/w% and 48.4w/w%. And from left in bottom row: 58.5w/w%, 61.3w/w%, 69.0w/w% and 74.2w/w%. First identified separation: 58.5w/w%.

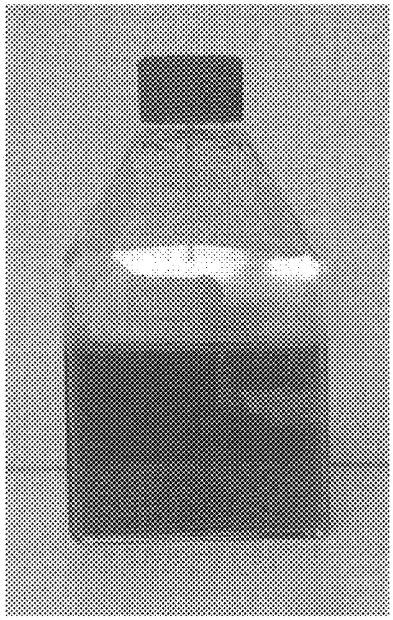

Figure 7: Flask type used in automated detection of separation into a top and a bottom phase. Height is 8.5 cm (to shoulder), width is 8.0 cm and depth is 3.5 cm.

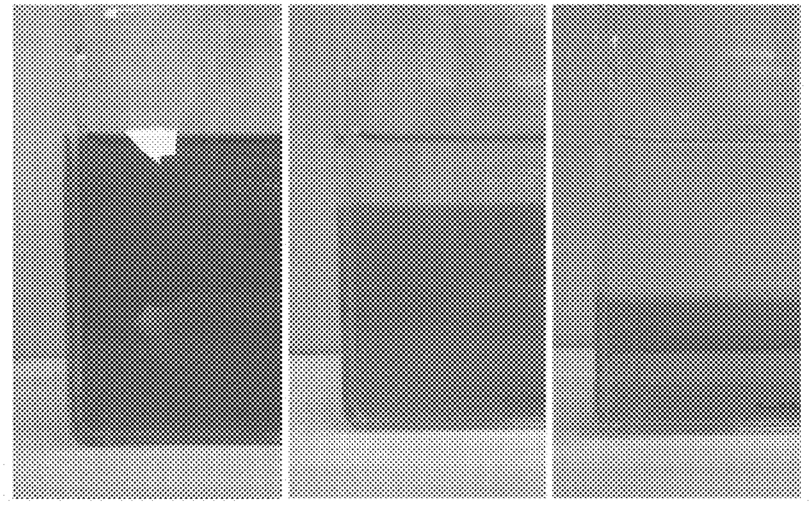
Figure 8: Photos of sample 2.1, 2.2 and 2.3 ready for automatic detection of separation into a top and a bottom phase.
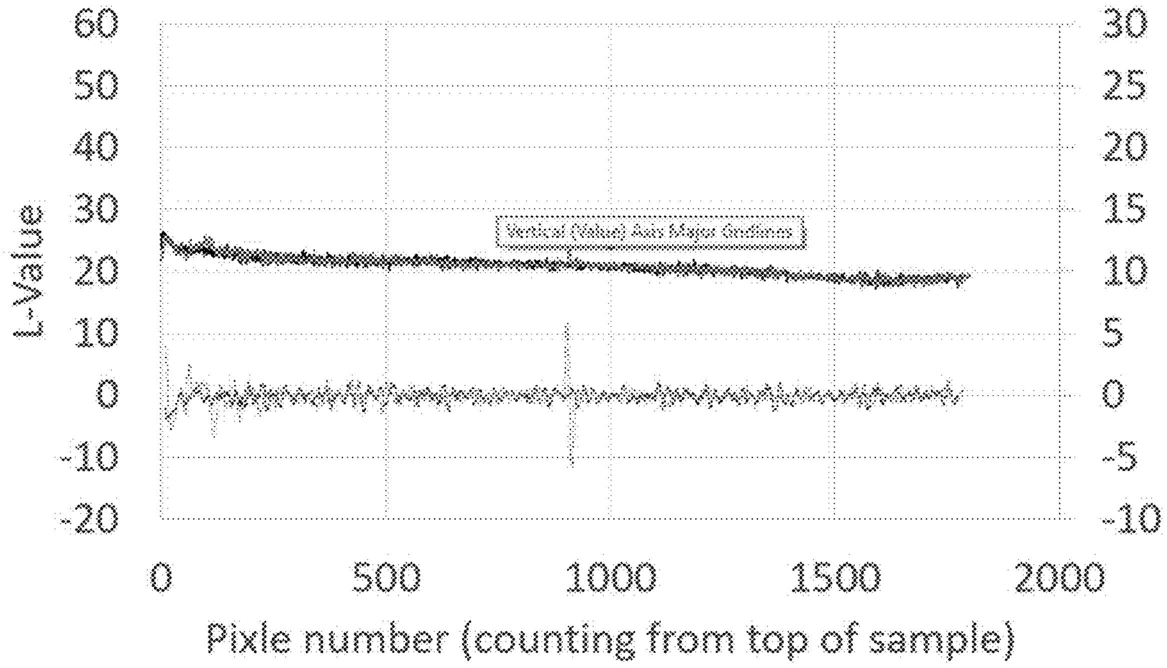
Figure 9: L-value and derivative value as function of position in sample 2.1. (Full lines are L-values (left axis) and dotted are derivatives (right axis); Black / grey indicate first and second measurement.)

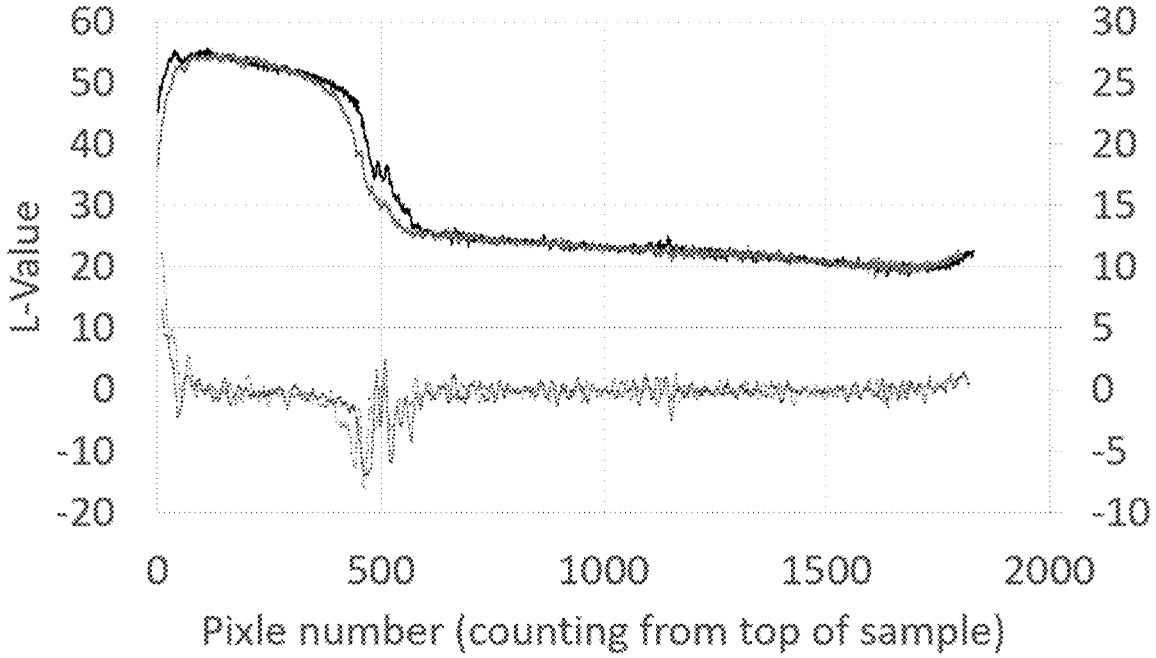

Figure 10: L-value and derivative value as function of position in sample 2.2. (Full lines are L-values (left axis) and dotted are derivatives (right axis); Black / grey indicate first and second measurement.)

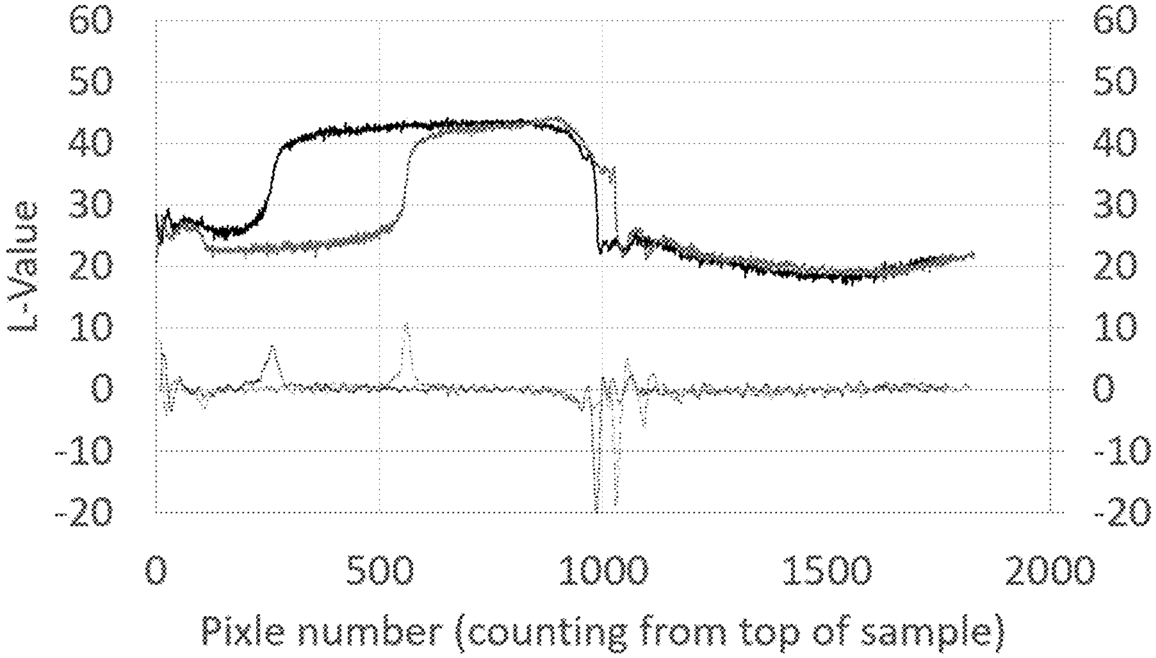

Figure 11: L-value and derivative value as function of position in sample 2.3. (Full lines are L-values (left axis) and dotted are derivatives (right axis); Black / grey indicate first and second measurement.)

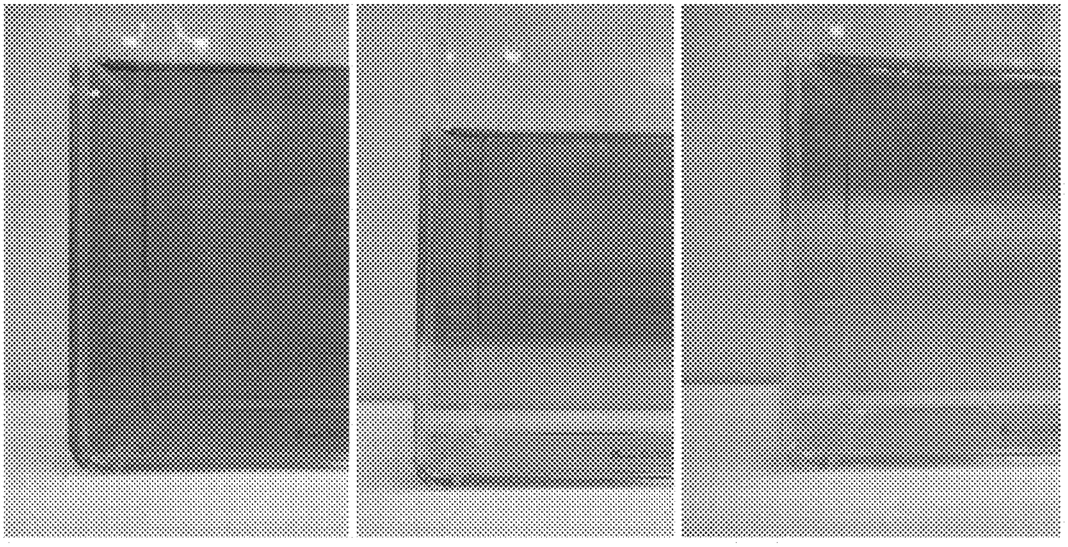
Figure 12: Photos of sample 2.4, 2.5 and 2.6 ready for automatic detection of separation into a top and a bottom phase.
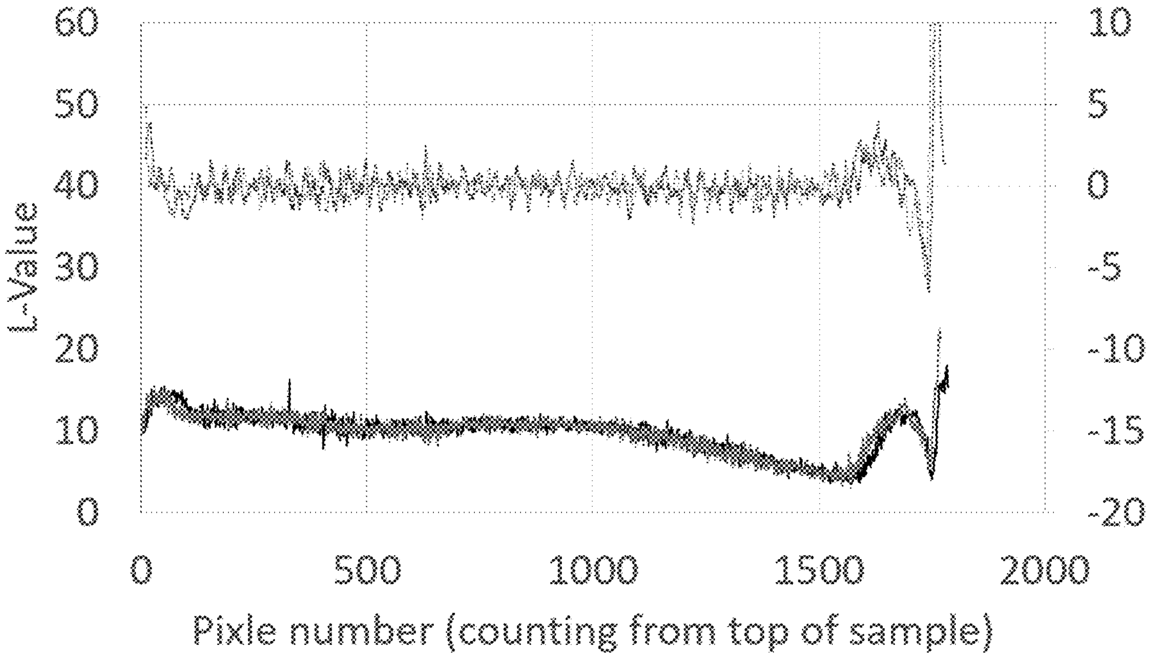
Figure 13: L-value and derivative value as function of position in sample 2.4. (Full lines are L-values (left axis) and dotted are derivatives (right axis); Black / grey indicate first and second measurement.)

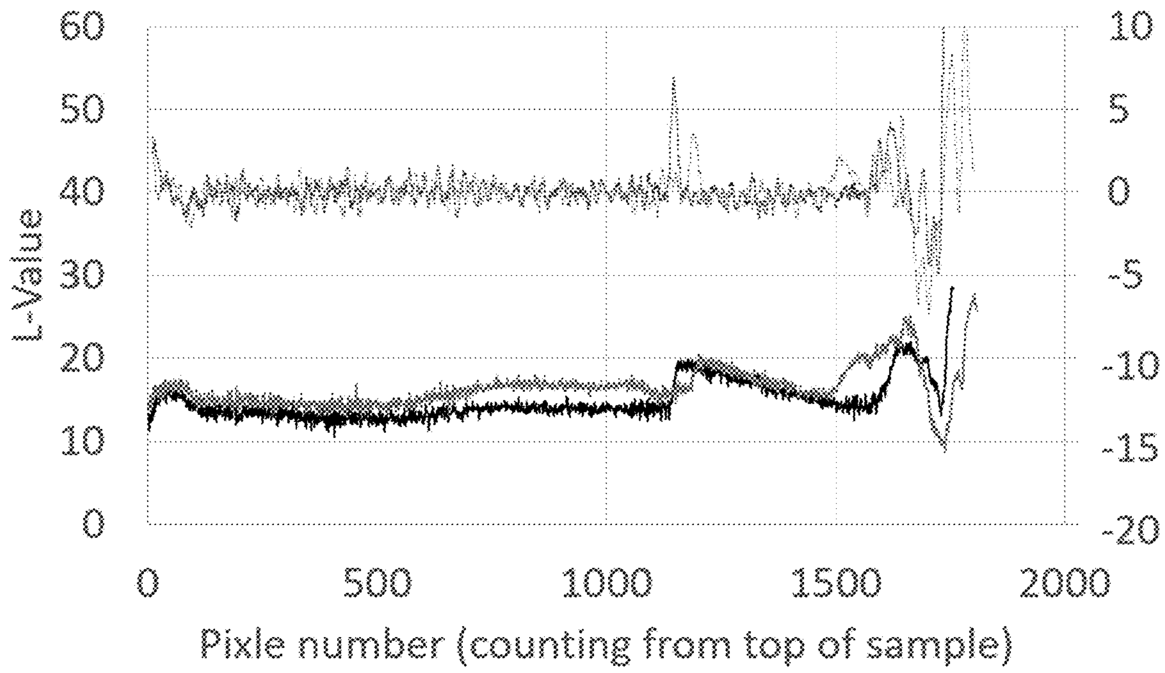

Figure 14: L-value and derivative value as function of position in sample 2.5. (Full lines are L-values (left axis) and dotted are derivatives (right axis); Black / grey indicate first and second measurement.)

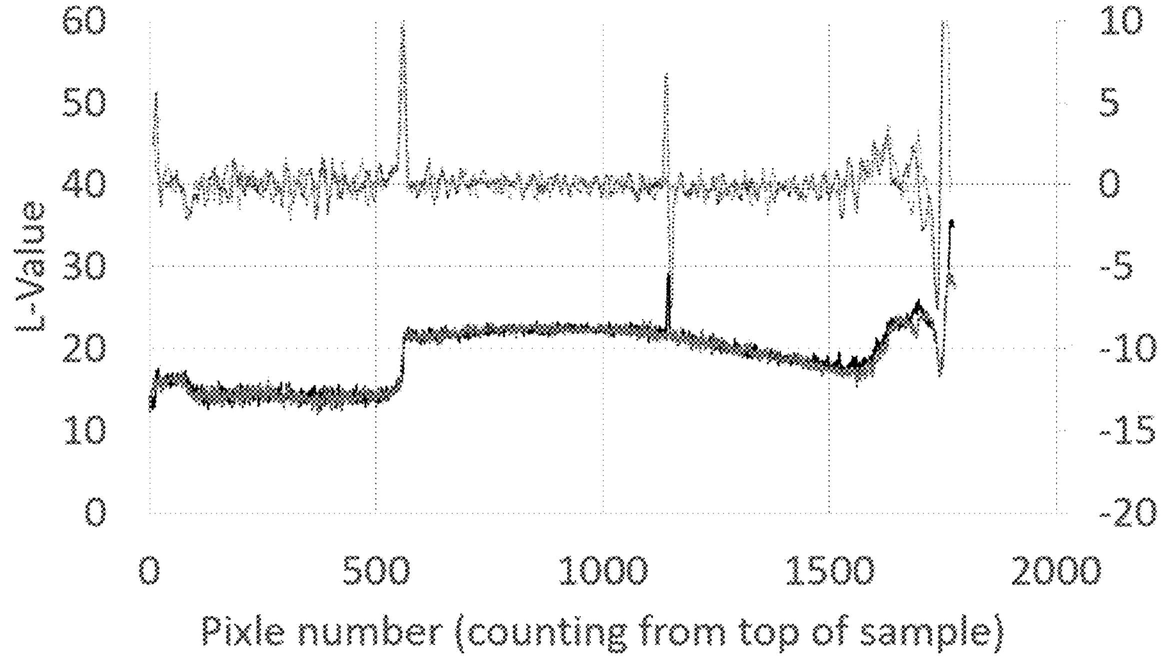

Figure 15: L-value and derivative value as function of position in sample 2.6. (Full lines are L-values (left axis) and dotted are derivatives (right axis); Black / grey indicate first and second measurement.)

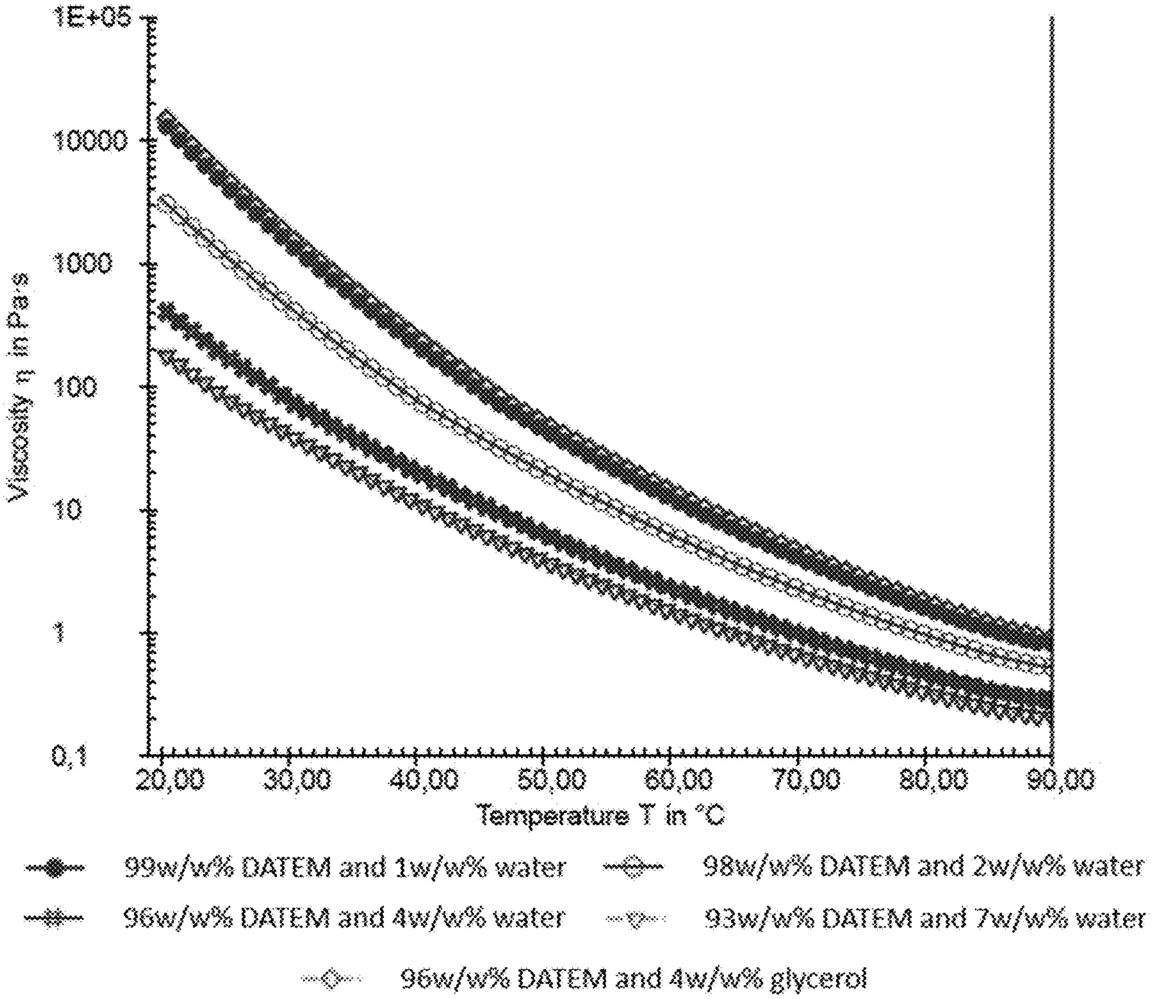
Figure 16: Description of viscosity curves of sample 1.1 mixed with less than 10% diluent.

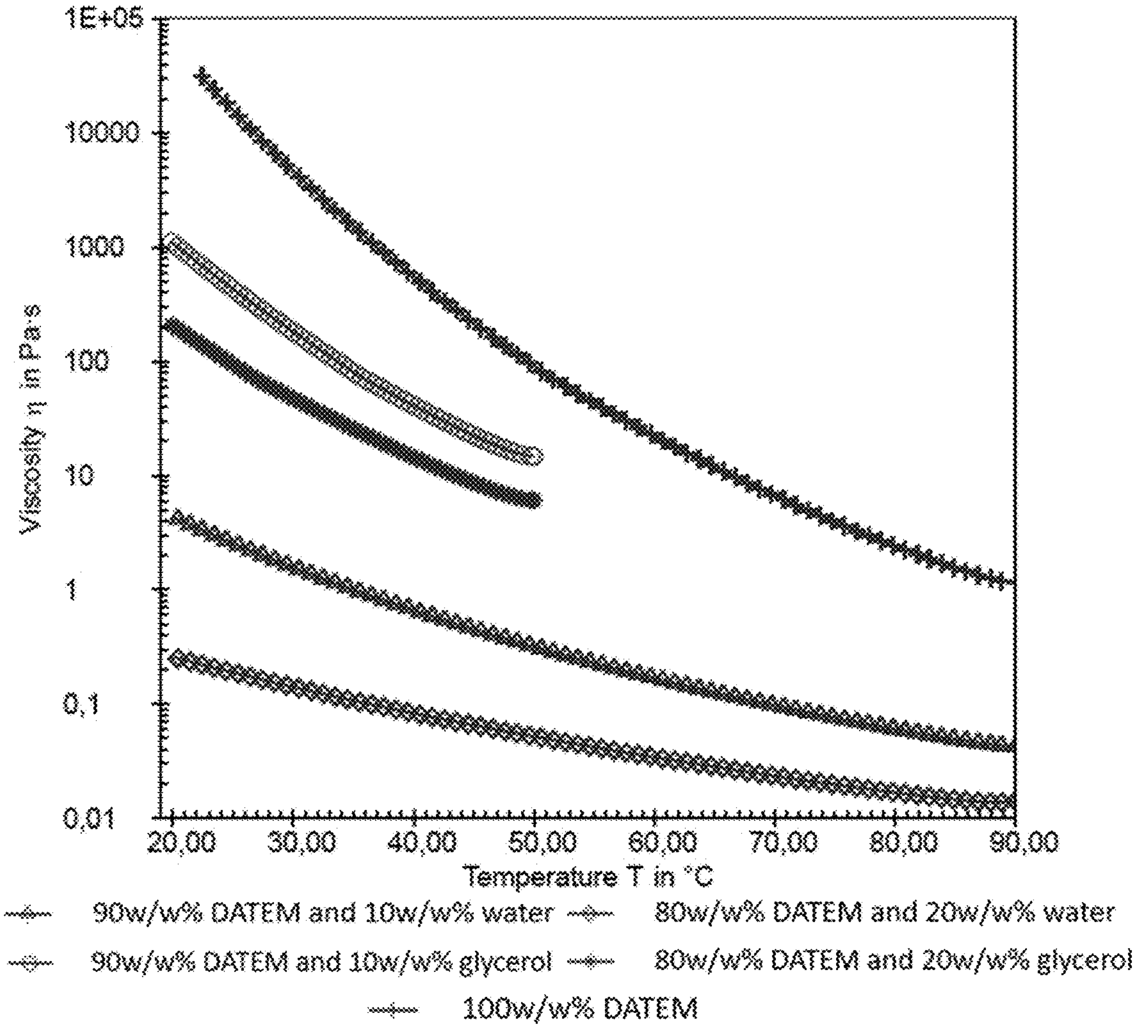
Figure 17: Description of viscosity curves of sample 1.1 mixed with more than 10% diluent.

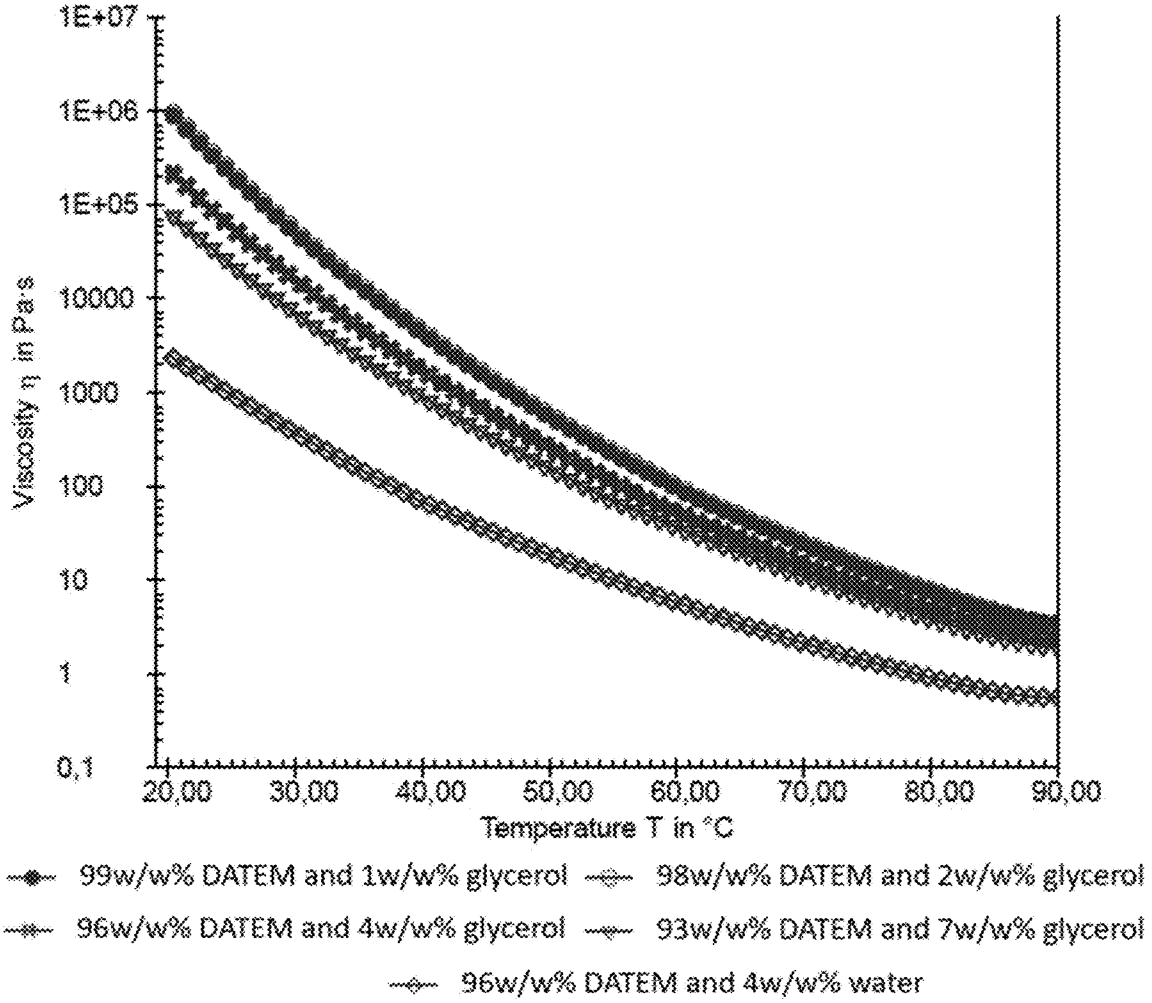
Figure 18: Description of viscosity curves of sample 1.2 mixed with less than 10% diluent.

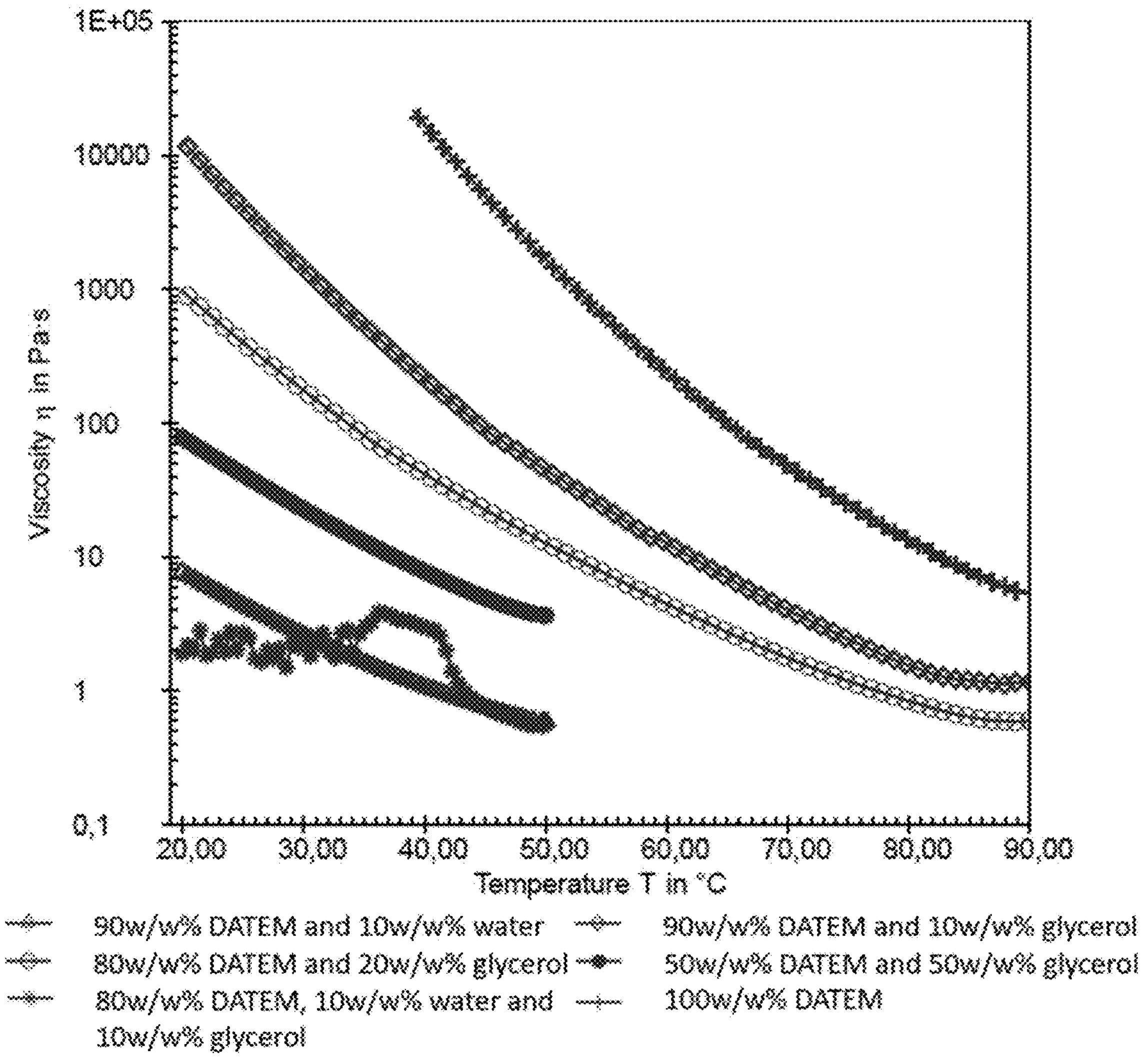
Figure 19: Description of viscosity curves of sample 1.2 mixed with 10% or more diluent.

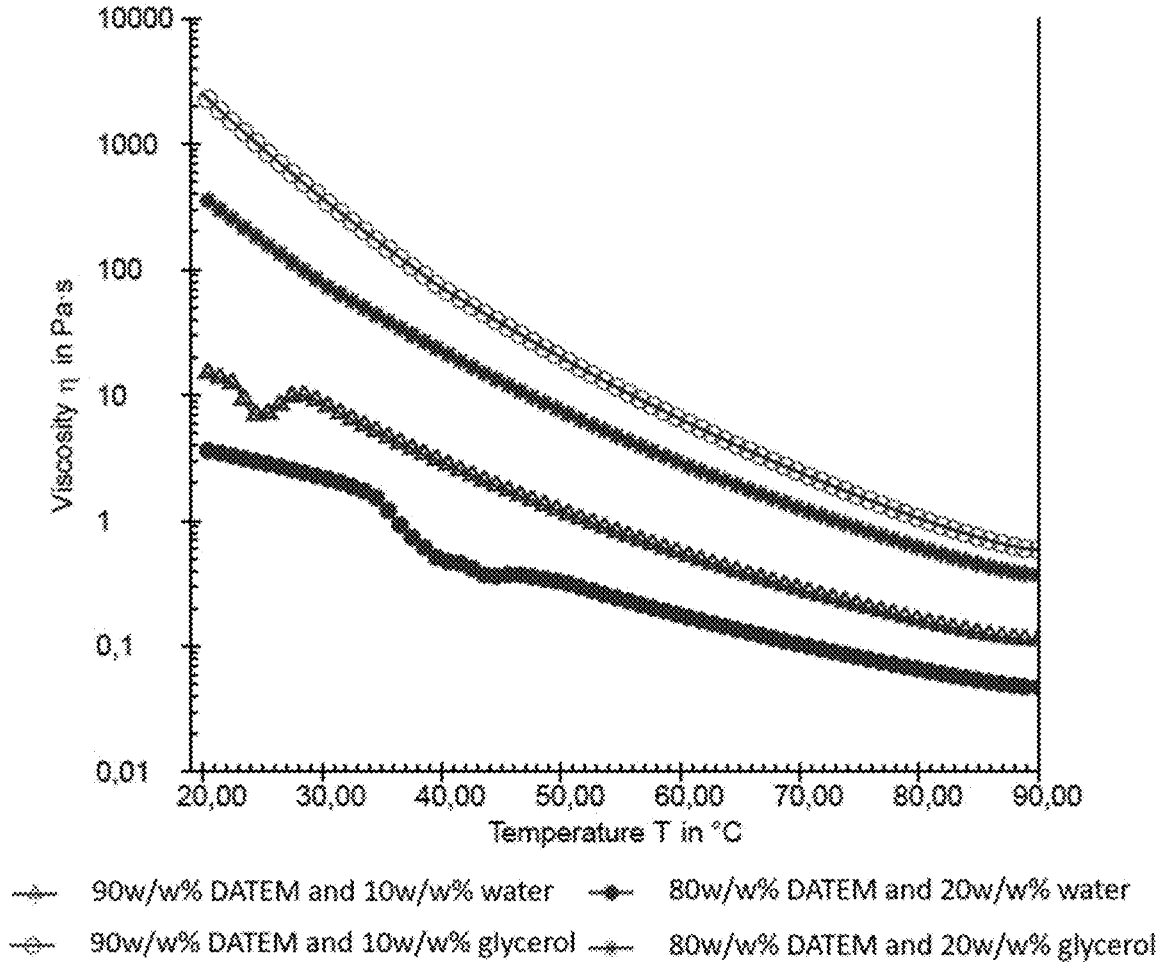
Figure 20: Description of viscosity curves of sample 1.3 mixed with diluent

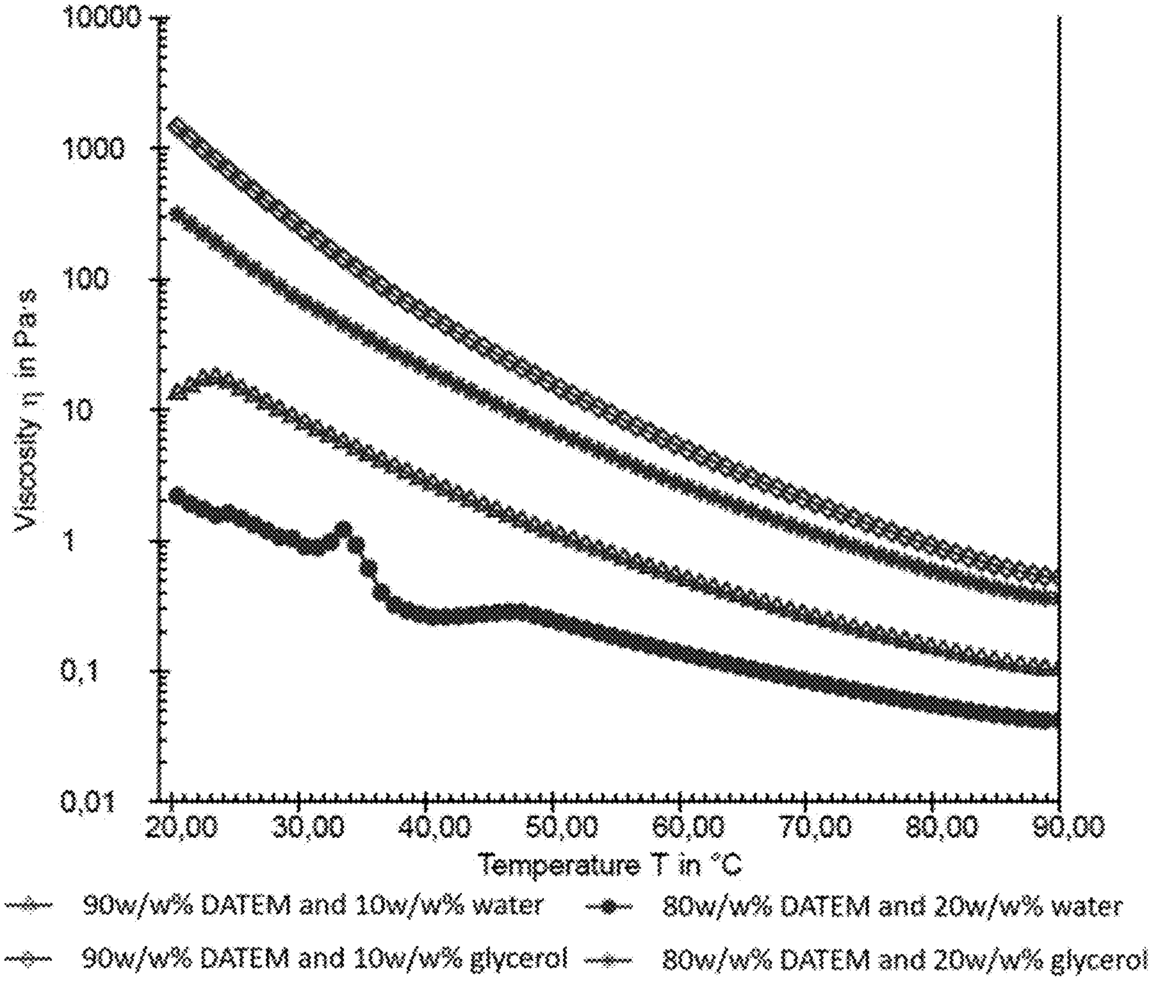
Figure 21: Description of viscosity curves of sample 1.4 mixed with diluent.

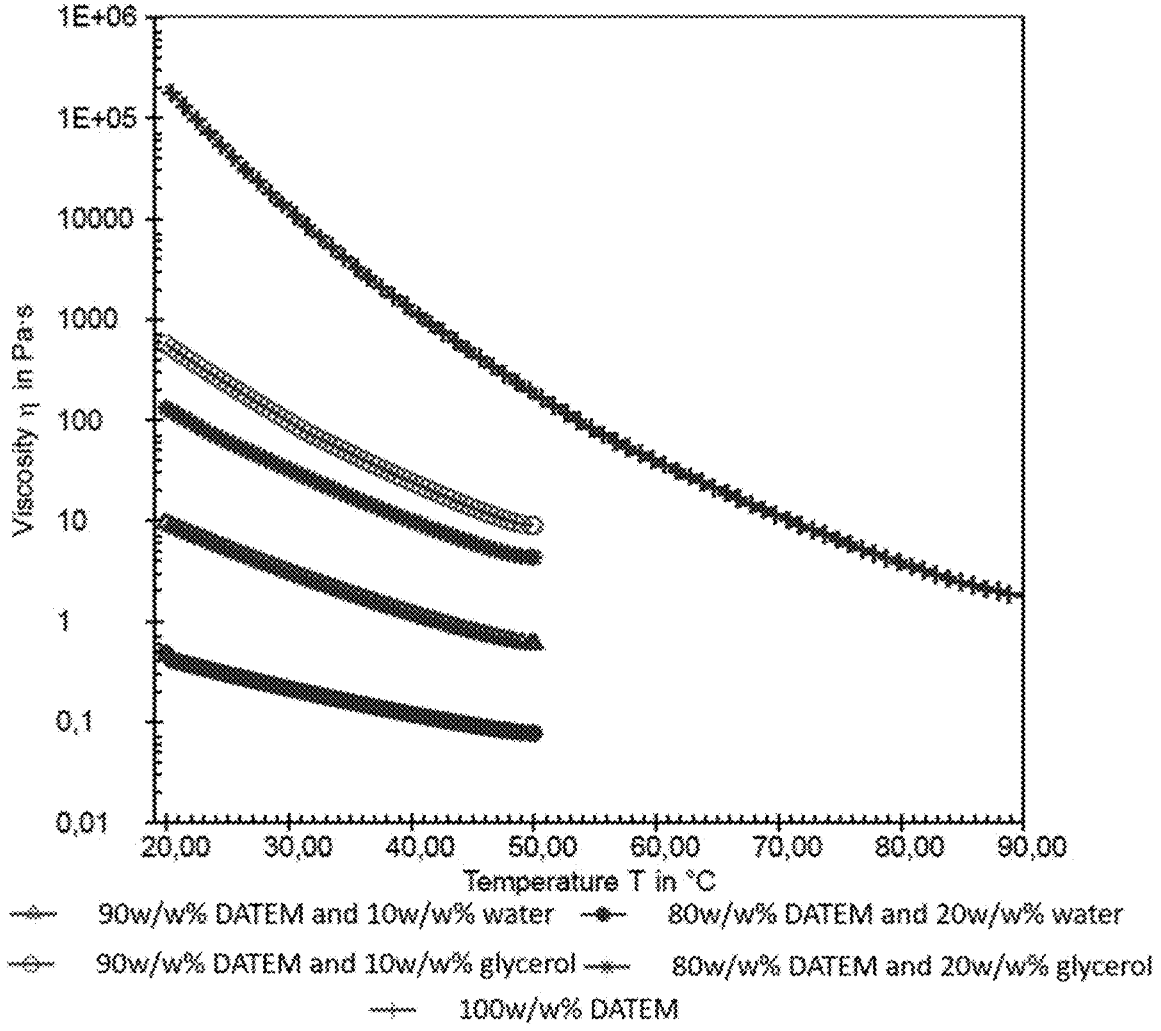
Figure 22: Description of viscosity curves of sample 1.5 mixed with diluent.

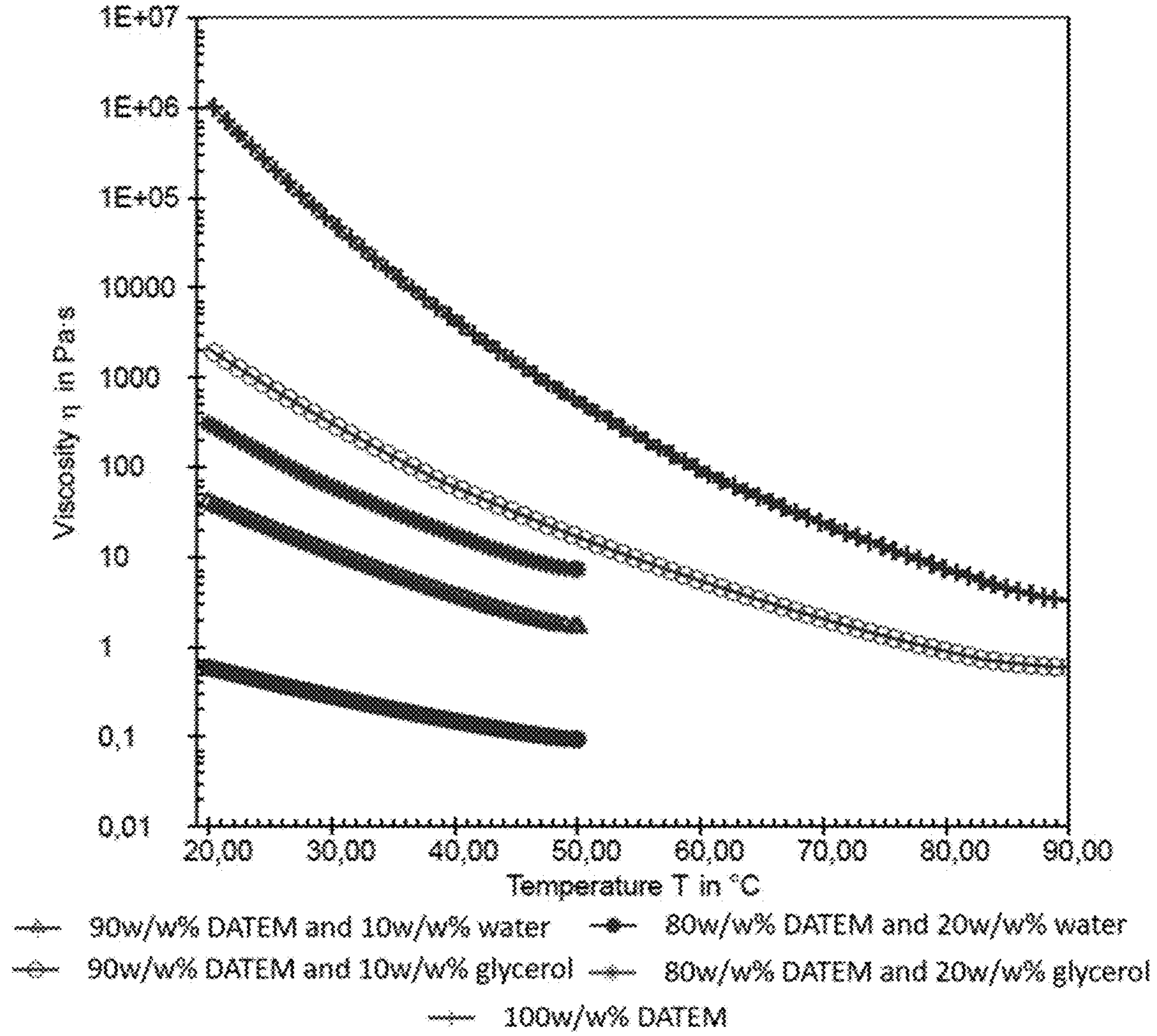
Figure 23: Description of viscosity curves of sample 1.6 mixed with diluent.

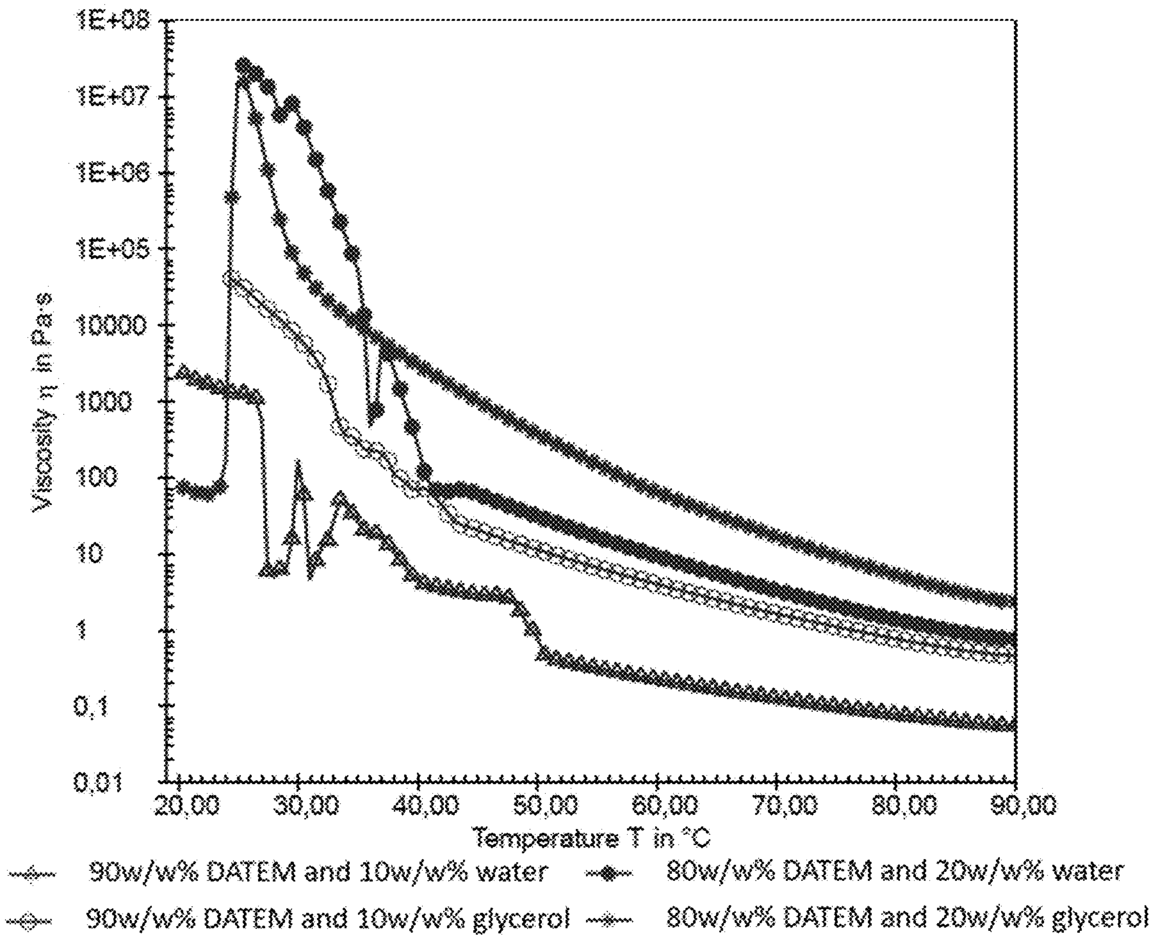
Figure 24: Description of viscosity curves of sample 1.7 mixed with diluent.

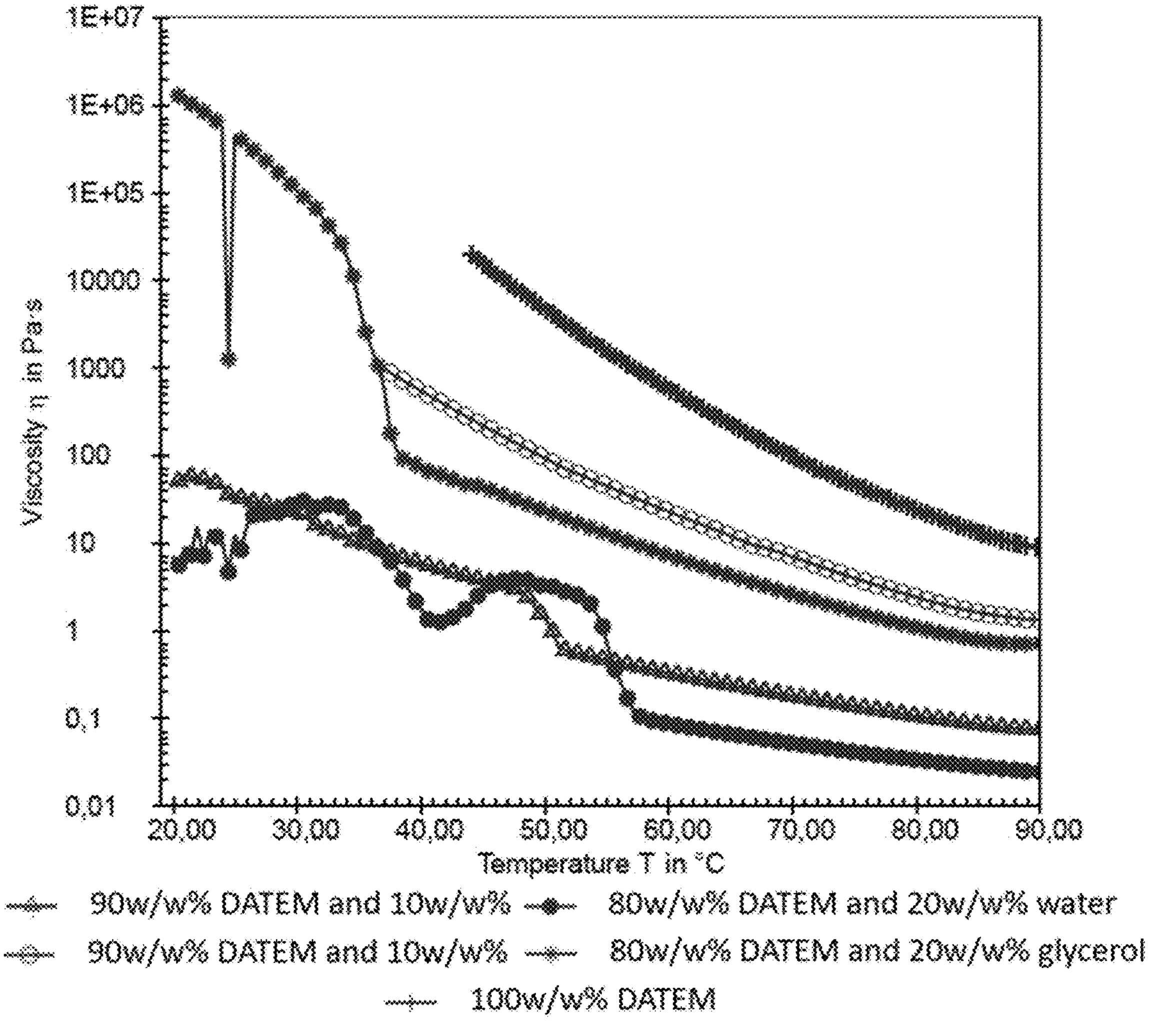
Figure 25: Description of viscosity curves of sample 1.8 mixed with diluent.

LIQUID COMPOSITIONS CONTAINING DATEM INGREDIENTS FOR PREPARATION OF DETERGENT COMPOSITIONS

CROSS-REFERENCE TO RELATED PATENT APPLICATIONS

This specification claims priority under 35 USC § 371 as a national phase of International Patent Application PCT/EP2021/083984 (filed Dec. 2, 2021; and published Jun. 9, 2022 as Int'l Publ. No. WO2022/117733), which, in turn, claims priority to EP patent application No. 20211915.2 (filed Dec. 4, 2020) and U.S. Provisional Patent Application No. 63/121,303 (filed Dec. 4, 2020). The entire text of each of the above-referenced patent applications is incorporated by reference into this specification for all purposes.

FIELD OF THE INVENTION

The present invention relates to a liquid DATEM composition, to a process for preparing the same and the use thereof.

BACKGROUND OF THE INVENTION

Diacetyl tartaric acid ester of mono- and diglycerides (DATEM) is a powerful emulsifier which is used extensively in bakery applications. The use in bakery is a relative mature market with significant but stable levels of DATEM usage.

Recently it has been reported that emulsifiers such as DATEM and CITREM can be used as surfactants in detergent compositions, such as laundry detergent compositions. The laundry detergent compositions disclosed in WO2020/058088; WO2020/058090 and WO2020/058096 were prepared as highly dilute aqueous emulsifier solutions in laboratory scale.

In its pure form at room temperature, DATEM's are generally sticky, waxy or viscous honeylike. Due to the stickiness and high viscosity of DATEM it cannot be handled efficiently or dosed accurately in a solid state in standard production facilities, such as in detergent production facilities. Conversion of DATEM's of high melting points into a liquid state is not a standard procedure in industrial scale, as it requires expensive and specialized equipment suitable for melting DATEM and tanks for keeping large quantities of hot DATEM. Certain low viscosity DATEM are known, such as Panodan visco-low, with viscosity lower than 2000 mPa·s at 20 °C, however this product mainly comprises DATEM IV. Free flowing powders of DATEM have been reported, however spray-crystallisation of DATEM II to provide a powder is difficult, and free-flowing powdered DATEM's are generally limited to DATEM's of fully saturated fatty acid esters. Liquid DATEM mixtures are generally prepared by mixing DATEM with large amounts of oil or partial acyl glycerides to decrease the viscosity of the DATEM, however oily compositions are undesirable for the preparation of laundry detergents. According to Compendium of Food Additive Specifications, FAO (Food and Agriculture Organization of the United Nations) JEFCA Monographs 7, 71$^{st}$ meeting 2009, p. 15, DATEM is dispersible in cold and hot water; and soluble in methanol, ethanol, acetone, and ethyl acetate, however organic solvents are undesirable for the preparation of laundry detergents.

SUMMARY OF THE INVENTION

The present invention addresses the problems of providing a composition comprising DATEM which can be handled easily, and which can be dosed accurately in an industrial scale in standard production facilities. In particular, the invention relates to providing an aqueous or hydrophilic, highly concentrated, uniform and/or storage stable liquid composition comprising DATEM rich in DATEM I and/or DATEM II.

Thus, in one aspect the present invention provides a liquid composition comprising DATEM rich in DATEM I and/or DATEM II, present in an amount of from 20 to 99% by weight, based on the total weight of the liquid composition, and a diluent, wherein said diluent is present in an amount of from 1 to 80% by weight, based on the total weight of the liquid composition, and wherein said diluent is selected from the group of polar protic solvents and mixtures thereof.

In one aspect the present invention provides a process for the preparation of the liquid composition.

The present inventors have surprisingly found that a homogeneous composition, i.e. a product having no separation line separating the composition into a top and a bottom phase, in some instances a transparent composition as well, having a reduced viscosity is obtained when a DATEM product rich in DATEM I and/or DATEM II is mixed with small amounts of polar protic solvents such as water, propylene glycol or glycerol or mixtures thereof. This was unexpected. The present inventors additionally found that mixing DATEM II or DATEM I and II with increasing amounts of polar protic solvents such as water, propylene glycol or glycerol or mixtures thereof provided two-phased compositions. As described above, liquid DATEM compositions are generally obtained by dissolving DATEM in oil or organic solvents, or by the preparation of highly dilute aqueous DATEM compositions. It was surprising that further reduction of the amount of polar protic solvent in the mixture would provide a liquid product not separating into a top and bottom phase. The liquid DATEM composition of the present invention is storage stable. The liquid composition of the present invention has a viscosity of less than 1000 Pa·s at 25 °C, thus it may for example be handled by pumping, thereby facilitating the transportation and the accurate dosing of the composition in industrial scale. The aqueous or hydrophilic composition comprising DATEM may be used for the preparation of laundry detergent compositions in industrial scale.

BRIEF DESCRIPTION OF THE DRAWINGS

FIG. 1: Photos showing visual test of sample 1.1 with glycerol as diluent evaluated at 30 °C. Diluent content in samples from left: 9.1 w/w %, 16.8 w/w %, 23.3 w/w %, 28.9 w/w %, 33.8 w/w %, 38.2 w/w %, 42.0 w/w %, 45.4 w/w % and 48.4 w/w %. First identified separation: 48.4 w/w %.

FIG. 2: Photos showing visual test of sample 1.2 with glycerol as diluent evaluated at 30 °C. Diluent content in samples from left: 58.5 w/w %, 61.3 w/w %, 69.0 w/w % and 74.2 w/w %. First identified separation: 69.0 w/w %.

FIG. 3: Photos showing visual test of sample 1.3 with water as diluent evaluated at 40 °C Diluent content in samples from left in top row: 9.1 w/w %, 16.8 w/w %, 23.3 w/w %, 28.9 w/w %, 33.8 w/w %, 38.2 w/w %, 42.0 w/w %, 45.4 w/w % and 48.4 w/w %. And from left in bottom row: 58.5 w/w %, 61.3 w/w %, 69.0 w/w % and 74.2 w/w %. First identified separation: 58.5 w/w %.

FIG. 4: Photos showing visual test of sample 1.3 with water as diluent evaluated at 30 °C Diluent content in samples from left in top row: 9.1 w/w %, 16.8 w/w %, 23.3 w/w %, 28.9 w/w %, 33.8 w/w %, 38.2 w/w %, 42.0 w/w %, 45.4 w/w % and 48.4 w/w %. And from left in bottom row: 58.5 w/w %, 61.3 w/w %, 69.0 w/w % and 74.2 w/w %. First identified separation: 58.5 w/w %.

FIG. 5: Photos showing visual test of sample 1.5 with water as diluent evaluated at 40 °C Diluent content in samples from left: 58.5 w/w %, 61.3 w/w %, 69.0 w/w % and 74.2 w/w %. First identified separation: 61.3 w/w %.

FIG. 6: Photos showing visual test of sample 1.6 with water as diluent evaluated at 40 °C Diluent content in samples from left in top row: 9.1 w/w %, 16.8 w/w %, 23.3 w/w %, 28.9 w/w %, 33.8 w/w %, 38.2 w/w %, 42.0 w/w %, 45.4 w/w % and 48.4 w/w %. And from left in bottom row: 58.5 w/w %, 61.3 w/w %, 69.0 w/w % and 74.2 w/w %. First identified separation: 58.5 w/w %.

FIG. 7: Flask type used in automated detection of separation into a top and a bottom phase. Height is 8.5 cm (to shoulder), width is 8.0 cm and depth is 3.5 cm.

FIG. 8: Photos of sample 2.1, 2.2 and 2.3 ready for automatic detection of separation into a top and a bottom phase.

FIG. 9: L-value and derivative value as function of position in sample 2.1. (Full lines are L-values (left axis) and dotted are derivatives (right axis); Black/grey indicate first and second measurement.)

FIG. 10: L-value and derivative value as function of position in sample 2.2. (Full lines are L-values (left axis) and dotted are derivatives (right axis); Black/grey indicate first and second measurement.)

FIG. 11: L-value and derivative value as function of position in sample 2.3. (Full lines are L-values (left axis) and dotted are derivatives (right axis); Black/grey indicate first and second measurement.)

FIG. 12: Photos of sample 2.4, 2.5 and 2.6 ready for automatic detection of separation into a top and a bottom phase.

FIG. 13: L-value and derivative value as function of position in sample 2.4. (Full lines are L-values (left axis) and dotted are derivatives (right axis); Black/grey indicate first and second measurement.)

FIG. 14: L-value and derivative value as function of position in sample 2.5. (Full lines are L-values (left axis) and dotted are derivatives (right axis); Black/grey indicate first and second measurement.)

FIG. 15: L-value and derivative value as function of position in sample 2.6. (Full lines are L-values (left axis) and dotted are derivatives (right axis); Black/grey indicate first and second measurement.)

FIG. 16: Description of viscosity curves of sample 1.1 mixed with less than 10% diluent.

FIG. 17: Description of viscosity curves of sample 1.1 mixed with more than 10% diluent.

FIG. 18: Description of viscosity curves of sample 1.2 mixed with less than 10% diluent.

FIG. 19: Description of viscosity curves of sample 1.2 mixed with 10% or more diluent.

FIG. 20: Description of viscosity curves of sample 1.3 mixed with diluent

FIG. 21: Description of viscosity curves of sample 1.4 mixed with diluent.

FIG. 22: Description of viscosity curves of sample 1.5 mixed with diluent.

FIG. 23: Description of viscosity curves of sample 1.6 mixed with diluent.

FIG. 24: Description of viscosity curves of sample 1.7 mixed with diluent.

FIG. 25: Description of viscosity curves of sample 1.8 mixed with diluent.

DETAILED DESCRIPTION

DATEM

As discussed above, diacetyl tartaric acid ester of mono- and diglycerides (DATEM) are well known emulsifiers. These emulsifiers are generally regarded as safe as food ingredients and can be prepared by several different methods.

Depending on the type of monoglycerides used as raw material, DATEM can be crystallized in block, flake or powder form or it can be a semi-liquid. As mentioned above, DATEM's are often sticky, waxy or highly viscous.

DATEM may be prepared by methods known in the art such as those disclosed in the following documents. U.S. Pat. No. 2,236,516 is an early patent specification indicating products obtained by reacting diacetyl tartaric acid with glyceryl monostearate. U.S. Pat. No. 2,938,027 discloses the reaction between mixtures of acetylated anhydrides of food acids such as e.g. tartaric acid containing 4 to about 95% of diacetylated tartaric acid and e.g. free acetic anhydride with partial glycerides of fatty acids to obtain products having improved color stability. GB1344518 discloses solid acetyl tartaric esters obtained by reacting at least partially acetylated tartaric acid with partial glycerides containing 55-65% monoglyceride and an iodine value below 5 which contain per mole of partial glyceride 0.91-1.8 mole tartaric acid residues and 1.8-3.4 mole acetic acid residues. These esters are described as solid free flowing powders whereas the traditional esters have a waxy or honey-like consistency. The difference in physical properties is due to the fact that these powders contain appreciable quantities of monoacetylated tartaric residues and/or non-acetylated tartaric residues. EP1016647 describes a procedure wherein purified tartaric acid anhydride is produced in step one followed by reaction with distilled monoglyceride and sodium stearate in a second step. In some instances, anti-caking agents are added to the final products. US2012/0058232 describes a method for preparing powdered diacetyl tartaric acid esters of mono- and diglyceride by an esterification reaction on the presence of concentrated phosphoric acid.

DATEM can be described by the chemical structures DATEM I through IV, which are the main chemical components of DATEM. In addition, DATEM compositions may contain unreacted mono- and mono-diglyceride, and triglyceride.

DATEM I

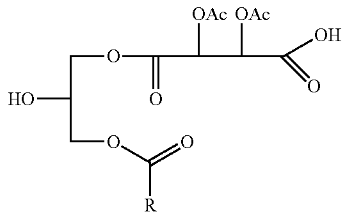

DATEM II

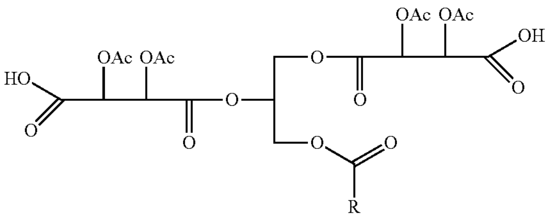

-continued

DATEM III

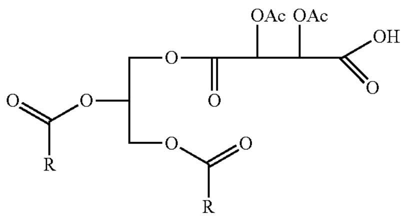

DATEM IV

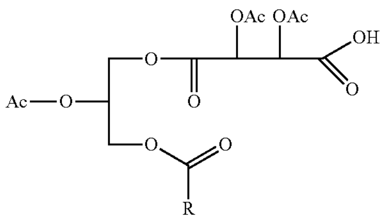

wherein R is a hydrocarbon chain, typically C7 to C21 alkyl-chains or alkenyl chains, i.e. hydrocarbon chains that are either saturated or contain one or more degrees of unsaturation. Typical fatty acids are described herein. Each of the molecules DATEM I-IV will have positional isomers wherein the position of each substituent or free hydroxyl group on the glycerol back bone may vary.

The diacetylated tartaric acid esters (DATEM) of the present invention can be prepared from monoglycerides based on commercially available fats and oils containing saturated and/or unsaturated fatty acids of variable lengths (C8-C22). The prepared DATEM is thus based on saturated and/or unsaturated fatty acids of variable lengths (C8-C22).

Suitable oils and fats raw materials for the monoglycerides are selected from but not limited to unrefined or refined, hydrogenated, partially hydrogenated or fractionated oils and fats of animal or vegetable origin such as but not limited to almond oil, babassu oil, butter oil, chicken fat, castor oil, cocoa butter, coconut oil, cotton seed oil, evening primrose oil, fish oil, hazelnut oil, linseed oil, maize oil, olive oil, palm kernel oil, palm oil, palm oil olein, peanut oil, rapeseed oil (high and low erucic), rice bran oil, safflower oil, high oleic safflower oil, sesame oil, shea fat, soybean oil, high oleic soybean oil, sunflower oil, high oleic sunflower oil, and mixtures thereof.

In an embodiment the liquid composition of the present invention comprises diacetylated tartaric acid esters of monoglycerides (DATEM), wherein the monoglycerides are based on saturated and/or unsaturated fatty acids of variable lengths (C8-C22). The fatty acids can be independently selected from both saturated and unsaturated fatty acids such as but not limited to caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, α-linolenic acid, stearidonic acid, eicosapentaenoic acid, docosahexaenoic acid, linoleic acid, γ-linolenic acid, dihomo-γ-linolenic acid, arachidonic acid, docosatetraenoic acid, palmitoleic acid, vaccenic acid, paullinic acid, oleic acid, elaidic acid, gondoic acid, erucic acid, mead acid.

In an embodiment the liquid composition of the present invention comprises DATEM compounds of DATEM I and DATEM II wherein the monoglycerides are based on saturated and/or unsaturated C12-C18 fatty acids.

In an embodiment the liquid composition of the present invention comprises DATEM compounds of DATEM I and DATEM II prepared from monoglycerides containing least 80% by weight, such as at least 85% by weight, such as at least 90% by weight, such as at least 95% by weight, such as at least 98% by weight of monoglycerides based on saturated and/or unsaturated C12-C18 fatty acids.

In an embodiment the liquid composition of the present invention comprises DATEM compounds of DATEM I and DATEM II prepared from monoglycerides containing least 80% by weight, such as at least 85% by weight, such as at least 90% by weight, such as at least 95% by weight, such as at least 98% by weight of monoglycerides based on saturated and/or unsaturated C16-C18 fatty acids.

In an embodiment the liquid composition of the present invention comprises DATEM compounds of DATEM I and DATEM II prepared from monoglycerides containing up to 20% by weight, such as up to 30% by weight, such as up to 40% by weight, such as up to 50% by weight, such as up to 60% by weight, such as up to 80% by weight, such as up to 100% by weight monoglycerides based on saturated C12-C18 fatty acids.

In an embodiment the liquid composition of the present invention comprises DATEM compounds of DATEM I and DATEM II prepared from monoglycerides containing up to 20% by weight, such as up to 30% by weight, such as up to 40% by weight, such as up to 50% by weight, such as up to 60% by weight, monoglycerides based on saturated C16-C18 fatty acids.

In an embodiment the liquid composition of the present invention comprises DATEM compounds rich in DATEM I and/or DATEM II prepared from monoglycerides containing at least 20% by weight, such as at least 30% by weight, such as at least 40% by weight, such as at least 50% by weight, such as at least 60% by weight, such as at least 80% by weight, such as at least 95% by weight monoglycerides based on unsaturated C12-C18 fatty acids.

In an embodiment the liquid composition of the present invention comprises DATEM compounds rich in DATEM I and/or DATEM II prepared from monoglycerides containing at least 20% by weight, such as at least 30% by weight, such as at least 40% by weight, such as at least 50% by weight, such as at least 60% by weight, such as at least 80% by weight, such as at least 95% by weight monoglycerides based on unsaturated C16-C18 fatty acids.

In an embodiment the liquid composition of the present invention comprises DATEM compounds rich in DATEM I and/or DATEM II comprising tartaric acid esters and fatty acid esters in a molar ratio [tartaric acid/monoglyceride] of from 0.8/1.0 to 2.0/1.0, such as from 1.0/1.0 to 2.0/1.0, such as from 1.2/1.0 to 2.0/1.0, such as from 1.4/1.0 to 2.0/1.0, such as from 1.5/1.0 to 2.0/1.0, as determined by hydrolysis of said DATEM compounds rich in DATEM I and/or DATEM II, according to the method described in the experimental section below.

In an embodiment the liquid composition of the present invention has a pH value between 0.5 and 4.7, such as of between 0.5 and 4 or such as of between 0.5 and 3. The pH value is measured by potentiometric measurement with a pH-meter at 20-25 °C The liquid composition, according to any one of the previous claims, wherein the DATEM ingredient has an acid value in the range between 80-160, preferably between 100-150. More preferably between 110-145.

In an embodiment the liquid composition of the present invention, the DATEM ingredient has a saponification value in the range between 500-700, preferably between 530-680. More preferably between 560-660.

In an embodiment the liquid composition of the present invention comprises a diluent selected from the group consisting of selected from water, glycerol and mixtures thereof in an amount of from 1% by weight, such as from 2%, such as from 3%, such as from 6%, such as from 8%, such as from 10, such as from 15%, such as from 20% by weight, based on the total weight of the liquid composition.

In an embodiment the liquid composition of the present invention comprises a diluent selected from the group of polar protic solvents consisting of or selected from water, glycerol and mixtures thereof in an amount of up to 80% by weight, such as 75%, such as up to 70%, such as up to 65%, such as up to 60%, such as up to 50%, such as up to 40%, based on the total weight of the liquid composition.

In an embodiment the liquid composition of the present invention has a combined amount of DATEM compounds rich in DATEM I and/or DATEM II and diluent of least 90% by weight, such as of at least 92% by weight, such as of at least 95% by weight, such as of at least 98% by weight, such as of at least 99% by weight, based on the total weight of the liquid composition.

The term 'diluent' indicates a diluting agent. In the present context the diluent decreases the viscosity of DATEM, thereby facilitating handling, transportation and/or pumping of the DATEM composition.

In an embodiment of the present invention the diluent used is water in an amount between 0.5%-80%, preferably between 1%-75% and more preferably between 2%-70%.

In an embodiment of the present invention the diluent used is glycerol in an amount of glycerol between 1%-80%, preferably between 3%-75%. More preferably between 6%-70%.

In an embodiment of the present invention the diluent used is a blend of glycerol and water in any ratio between glycerol and water in an amount between 0.5%-80%, preferably between 1%-75% of the total product. More preferably between 2%-70%.

As used herein, the term homogeneous means a composition which does not separate into a top and bottom phase upon standing at a temperature between 20 °C and 40 °C for 24 hours into a top phase and bottom phase having with a visible separation line. Liquid compositions which separated into e.g. meso phases or emulsions were considered homogeneous.

In an embodiment the liquid composition of the present invention has a viscosity of up to 3000 Pa*s, preferably of up to 2000 Pa*s, more preferably of up to 1200 Pa*s, such as up to 1000 Pa*s, up to 900 Pa*s, up to 800 Pa*s or up to 700 Pa*s as measured at a shear rate of 50 1/s during a temperature sweep from 90-20 °C or 50-20 °C with a cooling rate of 1 °C/min using measuring system CC27 in Anton Paar Physica MC301 rheometer.

In an embodiment the liquid composition of the present invention has a viscosity of at least 0.05 Pa*s, such as of at least 0.1 Pa*s, such as of at least 0.5 Pa*s, such as of at least 1.0 Pa*s, such as of at least 1.5 Pa*s, such as of at least 2 Pa*s, such as of at least 5 Pa*, such as of at least 10 Pa*s measured at a shear rate of 50 1/s during a temperature sweep from 90-20 °C or 50-20 °C with a cooling rate of 1 °C/min using measuring system CC27 in Anton Paar Physica MC301 rheometer.

The liquid composition has a viscosity less than 50% of the viscosity of the pure DATEM, preferably less than 30% of the viscosity of the pure DATEM, more preferably less than 10% of the pure DATEM.

Viscosity of the liquid compositions of the present invention were measured according to ISO3219, at a shear rate of 50 1/s during a temperature sweep from 90-20 °C or 50-20 °C with a cooling rate of 1 °C/min using Bob-cup measuring system CC 27, Serial number 17307, using a 19 ml sample in an Anton Paar Physica MC301 rheometer. The samples were heated to the initial measuring temperature, i.e. either to 90 or 50 °C, before being transferred to the rheometer.

In an embodiment the liquid composition of the present invention is a homogeneous composition (macroscopic homogeneous composition).

In an embodiment the liquid composition of the present invention is a homogeneous liquid as determined by visual inspection. In the present context, the term 'transparent liquid' indicates that light is allowed to pass through the liquid without appreciable reflection or scattering of the light. The transparent liquid appears clear, with the overall appearance of one color.

The composition of the present invention may contain one or more further components, for example antioxidant, such as alpha tocopherol, or anti-microbial substances, such as potassium sorbate.

In one embodiment, the liquid composition of the present invention find use in the preparation of detergent compositions. As used herein, the term "detergent composition" or "detergent formulation" is used in reference to a composition intended for use in a wash medium (e.g. a wash liquor) for the cleaning of soiled or dirty objects, including particular textile or non-textile objects or items. Such detergent compositions are not limited to any particular detergent composition or formulation. Indeed, in some embodiments, the detergents of the invention comprise at least one DATEM and, in addition, one or more surfactants, transferase(s), hydrolytic enzymes, oxido reductases, builders (e.g., a builder salt), bleaching agents, bleach activators, bluing agents, fluorescent dyes, caking inhibitors, masking agents, enzyme activators, antioxidants, and/or solubilizers. In some instances, a builder salt is a mixture of a silicate salt and a phosphate salt, preferably with more silicate (e.g., sodium metasilicate) than phosphate (e.g., sodium tripolyphosphate). Some compositions of the invention, such as, but not limited to, cleaning compositions or detergent compositions, do not contain any phosphate (e.g., phosphate salt or phosphate builder).

In some embodiments, the cleaning or detergent compositions of the present disclosure further comprise adjunct materials including, but not limited to, surfactants, builders, bleaches, bleach activators, bleach catalysts, other enzymes, enzyme stabilizing systems, chelants, optical brighteners, soil release polymers, dye transfer agents, dispersants, suds suppressors, dyes, perfumes, colorants, filler salts, hydrotropes, photoactivators, fluorescers, fabric conditioners, hydrolyzable surfactants, preservatives, anti-oxidants, anti-shrinkage agents, anti-wrinkle agents, germicides, fungicides, color speckles, silvercare, anti-tarnish and/or anti-corrosion agents, alkalinity sources, solubilizing agents, carriers, processing aids, pigments, and pH control agents.

The detergent or cleaning compositions of the present invention are advantageously employed for example, in laundry applications, hard surface cleaning, dishwashing applications, as well as personal care or cosmetic applications such as dentures, toothpastes, cosmetics, lotions, shampoos, conditioners, creams, wipes, pre-moistened wipes, balms, pastes, or ointments. In addition, due to the unique advantages of increased effectiveness in lower temperature solutions, the enzymes of the present invention are ideally suited for laundry applications. Examples of laundry detergents that the present DATEM compositions can be used in include those in WO2020058088, WO2020058090, and WO2020058096.

The invention will now be described, by way of example only, with reference to the following Examples.

EXPERIMENTAL SECTION

DATEM Preparation

The procedure for synthesizing DATEM before formulating the DATEM with polar protic solvents (e.g. water and/or glycerol) is described below. The amounts of reactants are indicated in table 1 and table 2, and in the following X1 refer to the amount of tartaric acid, X2 refer to the amount of acetic acid, X3 the amount of 1% H2SO2 solution in acetic acid, X4 the amount of distilled monoglyceride product and X5 the amount of Ca(OAc)2.

X1 g foodgrade L-Tartaric acid was together with X2 g acetic acid anhydride dosed into a 1 L three-necked round bottomed flask equipped with a stirrer, condenser and thermometer. X3 mL 1% H2SO4 in acetic acid (v/v) was added slowly while stirring with an overhead stirrer. The reaction mixture was heated to 110 °C for approximately 10 minutes.

X4 g distilled monoglyceride (fatty acid composition indicated in table 1 and table 2) was charged into another three-necked round bottomed flask. X5 g Ca(OAc)2 was added to the monoglyceride (for later neutralisation of the H2SO4 in the first reaction).

The reaction product of the tartaric acid, acetic acid anhydride mixture was added to the distilled monoglyceride containing Ca(OAc)2. The combined reaction mixture was heated to 105 °C and acetic acid was distilled off at reduced pressure (115-15 mbara) until distillate flow rate low.

Finally, residues of acetic acid were removed by passing water vapour through the product at 110 °C and 10 mbara for 30 minutes.

TABLE 1

Recipe details for DATEM samples 1.1, 1.2, 1.3 and 1.4 prepared in example 1. (TA to mono ratio is estimated assuming all acyl glycerol is mono glyceride with the most dominating fatty acid in the composition.)

| DATEM sample ID | | 1.1 | 1.2 | 1.3 | 1.4 |
|---|---|---|---|---|---|
| Di Acetylated Tartaric acid | | | | | |
| Tartaric acid (X1) | g | 379 | 421 | 418 | 418 |
| 1% sulphuric acid in Acetic acid (X2) | mL | 2.53 | 2.81 | 2.8 | 2.8 |
| Acetic Acid Anhydride (X3) | g | 773 | 859 | 855 | 855 |
| DATEM | | | | | |
| Distilled monoglyceride (X4) | g | 600 | 500 | 653 | 653 |
| Ca(OAc)2 (X5) | g | 8.1 | 9 | 8.9 | 8.9 |
| TA to mono ratio | mol/mol | 1.5 | 2.0 | 1.5 | 1.5 |
| Fatty acid composition | | | | | |
| C8 | | 0 | 0 | 0 | 0 |
| C10 | | 0 | 0 | 0 | 0 |
| C12 | | 0.1 | 0.1 | 0.2 | 0.3 |
| C14 | | 0.1 | 0.1 | 1 | 1.1 |
| C15 | | 0 | 0 | 0.1 | 0.1 |
| C16 | | 4.4 | 4.4 | 40.6 | 33.9 |
| C16:1 | | 0.1 | 0.1 | 0.2 | 0.4 |
| C17 | | 0.1 | 0.1 | 0.1 | 0.1 |
| C18 | | 3.4 | 3.4 | 4.2 | 3.6 |
| C18:1 | | 79.9 | 79.9 | 41.3 | 46 |
| C18:2 | | 10 | 10 | 11.2 | 13.3 |
| C18:3 | | 0.1 | 0.1 | 0.3 | 0.4 |
| C20 | | 0.3 | 0.3 | 0.4 | 0.4 |
| C20:1 | | 0.4 | 0.4 | 0.2 | 0.2 |

TABLE 1-continued

Recipe details for DATEM samples 1.1, 1.2, 1.3 and 1.4 prepared in example 1. (TA to mono ratio is estimated assuming all acyl glycerol is mono glyceride with the most dominating fatty acid in the composition.)

| DATEM sample ID | 1.1 | 1.2 | 1.3 | 1.4 |
|---|---|---|---|---|
| C22 | 0.8 | 0.8 | 0.1 | 0.1 |
| C24 | 0.3 | 0.3 | 0.1 | 0.1 |
| SAFA | 9.5 | 9.5 | 46.8 | 39.7 |
| MUFA | 80.4 | 80.4 | 41.7 | 46.6 |
| PUFA | 10.1 | 10.1 | 11.5 | 13.7 |
| Sum C16:x + C18:x | 98.0 | 98.0 | 97.9 | 97.7 |

TABLE 2

Recipe details for DATEM samples 1.5, 1.6, 1.7 and 1.8 prepared in example 1. (TA to mono ratio is estimated assuming all acyl glycerol is mono glyceride with the most dominating fatty acid in the composition.)

| DATEM sample ID | | 1.5 | 1.6 | 1.7 | 1.8 |
|---|---|---|---|---|---|
| Di Acetylated Tartaric acid | | | | | |
| Tartaric acid (X1) | g | 410 | 465 | 377 | 419 |
| 1% sulphuric acid in Acetic acid (X2) | mL | 2.74 | 3.11 | 768 | 854 |
| Acetic Acid Anhydride (X3) | g | 837 | 948 | 2.52 | 2.8 |
| DATEM | | | | | |
| Distilled monoglyceride (X4) | g | 500 | 425 | 600 | 500 |
| Ca(OAc)2 (X5) | g | 8.77 | 9.94 | 8.06 | 8.95 |
| TA to mono ratio | mol/mol | 1.5 | 2.0 | 1.5 | 2.0 |
| Fatty acid composition | | | | | |
| C8 | | 0 | 0 | 0 | 0 |
| C10 | | 0 | 0 | 0 | 0 |
| C12 | | 96.4 | 96.4 | 0 | 0 |
| C14 | | 0.1 | 0.1 | 0.1 | 0.1 |
| C15 | | 0 | 0 | 0.2 | 0.2 |
| C16 | | 1.4 | 1.4 | 5.5 | 5.5 |
| C16:1 | | 0 | 0 | 0 | 0 |
| C17 | | 0 | 0 | 0.2 | 0.2 |
| C18 | | 2.1 | 2.1 | 89.9 | 89.9 |
| C18:1 | | 0 | 0 | 0.9 | 0.9 |
| C18:2 | | 0 | 0 | 0.2 | 0.2 |
| C18:3 | | 0 | 0 | 0.1 | 0.1 |
| C20 | | 0 | 0 | 1.9 | 1.9 |
| C20:1 | | 0 | 0 | 0.1 | 0.1 |
| C22 | | 0 | 0 | 0 | 0 |
| C24 | | 0 | 0 | 0 | 0 |
| SAFA | | 100 | 100 | 98.7 | 98.7 |
| MUFA | | 0 | 0 | 1 | 1 |
| PUFA | | 0 | 0 | 0.3 | 0.3 |
| Sum C16:x + C18:x | | 98.0 | 3.5 | 96.8 | 96.8 |

Chemical Characterisation of DATEM

The samples 1.1-1.6 previously prepared were characterised analytically by their building blocks, i.e. content of glycerol, tartaric acid and fatty acids after hydrolysis of the product.

A DATEM sample is transesterified by reaction with excess of anhydrous methanol in the presence of an acidic catalyst at elevated temperature. During the transesterification glycerol and methyl esters of acetic acid, tartaric acid and fatty acids are formed. The hydroxyl groups of the tartaric acid methyl esters and glycerol are silylated by means of N-methyl-N-trimethysilyl-triflouroacetamide (MSTFA). The silylated components can be quantified by GC-FID relative to the C14 alkane used as internal standard.

For the calibration a blend of monoglyceride and tartaric acid is used. The GC is equipped with programable temperature inlet (PTV), Flame Ionisation Detector (FID). The column is a WCOT fused silica 10-15 m×0.25 mm ID×0.1µ film thickness. Coating 5% phenyl methyl silicone.

The results of the building block analyses are summarised in table 3.

TABLE 3

Results of building block analysis of the six samples prepared in example 1.

| | IDs (referring to samples prepared in example 1) | | | | | |
|---|---|---|---|---|---|---|
| Compound | 1.1 | 1.3 | 1.4 | 1.5 | 1.7 | 1.8 |
| Glycerol/w/w % | 13.25 | 13.92 | 13.85 | 14.90 | 13.21 | 11.27 |
| Tartaric acid/w/w % | 31.19 | 31.63 | 31.67 | 35.25 | 31.53 | 34.98 |
| FFA/w/w % | 41.37 | 40.50 | 40.39 | 32.94 | 41.90 | 36.26 |
| Tartaric acid:glycerol ratio/mol/mol | 1.44 | 1.39 | 1.40 | 1.45 | 1.46 | 1.90 |

Acid value and saponification value of DATEM samples can be analysed as follows:

Saponification value: AOCS Cd 3b

Acid value: AOCS Cd 3d

The results of the acid value and saponification value analyses are presented in table 4.

TABLE 4

Results of acid value and saponification value analysis in six samples prepared as described in example 1.

| | DATEM IDs (referring to samples prepared in example 1) | | | | | | | |
|---|---|---|---|---|---|---|---|---|
| Property | 1.1 | 1.2 | 1.3 | 1.4 | 1.5 | 1.6 | 1.7 | 1.8 |
| Acid value | 120.9 | 154.4 | 119.8 | 121.9 | 135.8 | 159.2 | 119.8 | 142.3 |
| Saponification value | 571 | | 576.1 | 578.8 | 647.4 | | 569 | 634 |

Samples 1.7 was analysed for pH as follows:

A sample of 5.0 g DATEM was mixed with in 95.0 g water at 60 °C, before measurement at same temperature. A standard instrument was then used to measure pH in the mixture. The instrument used is a HACH HQ411d pH/mv (Serial no.: 161200008496) and using an electrode type PHC 2002-8 (Red Rod) (Ph 0 . . . 12, −10 . . . 100 °C). The reference system was Symmetrical light protected Ag/AgCl cartridges.

pH was measured to 1.64 in the sample.

EXAMPLES

Example 1: Preparation of Liquified DATEM and Visual Physical Assessment of the Liquid Composition In the procedure description either water or glycerol or a fixed blend is used throughout this example, and it is referred to as the diluent. Evaluation of phase separation in the lab was done after the procedure described below.

100 g DATEM was heated to 90 °C in a round bottom flask with agitation. 10 g of diluent was added, and the mixture agitated for 15 minutes. A 3 g sample was taken from the flask and put in a smaller glass bottle and placed in a heating cabinet at 40 °C. Then another 10 g diluent was added to the round bottomed flask followed by 15 minutes agitation. Then a second 3 g sample taken and placed in a new small glass bottle, which was also placed at 40 °C. The steps of adding more diluent, agitation and sampling was repeated to obtain a series of samples with more and more diluent. The series of additions were (including the two additions described above): 10 g, 10 g, 10 g, 10 g, 10 g, 10 g, 10 g, 10 g, 10 g, 10 g, 33 g, 33 g, 66 g and 66 g. This produces 14 samples of each 3 g and with increasing concentration of diluent.

The 14 samples were then evaluated for phase separation after 24 hours. This was done visually and documented with photos. A sample was considered as homogeneous, if a sample was not separated into a top phase and bottom phase with a visible separation line. I.e. samples separated into meso phases or emulsions were considered homogeneous.

After the 40 °C evaluation the 14 samples were placed in a heating cabinet at 30 °C for 24 hours before the samples were again evaluated for phase separation. After the 30 °C evaluation the 14 samples were placed in an air-conditioned laboratory at 20 °C for 24 hours before the samples were again evaluated for phase separation.

The above described procedure was applied to the six samples (1.1 through 1.6) in combination with various diluents. All samples exhibited qualitatively the same behaviour: The samples with smaller amounts of diluent did not show any separation into a top and a bottom phase. Six examples are shown in FIG. 1, FIG. 2, FIG. 3, FIG. 4, FIG. 5 and FIG. 6. A summary of the results is provided in table 5, were it is indicated at which diluent concentration the mixtures separate into a top and a bottom phase.

In one case, a similar, but slightly different method was used. In this case three samples ware made from sample 1.1 and water. Sample 1.1 was heated to 80 °C and water was added under agitation before the sample was cooled. Three samples were made using this procedure: One with 80 g sample 1.1 and 20 g water, a second with 50 g sample 1.1 and 50 g water and a third with 30 g sample 1.1 and 70 g water. After 24 h at 20 °C only the first sample remained homogeneous, i.e. there was not separation into a top and bottom phase.

TABLE 5

Overview of the amount of diluent (w/w % of water or glycerol) added to the DATEM before separation into a top and bottom phase was (indicated with 1:) and first sample where separation was observed (indicated with 2:) in DATEM samples prepared as described in example 1.

| DATEM | Water | | | Glycerol | | |
|---|---|---|---|---|---|---|
| Sample | 20° C. | 30° C. | 40° C. | 20° C. | 30° C. | 40° C. |
| 1.1 | 1: 20<br>2: 50 | — | — | 1: 45.4<br>2: 48.4 | 1: 45.4<br>2: 48.4 | 1: 45.4<br>2: 48.4 |
| 1.2 | — | — | — | 1: 61.3<br>2: 69.0 | 1: 61.3<br>2: 69.0 | 1: 61.3<br>2: 69.0 |
| 1.3 | 1: 48.4<br>2: 55.8 | 1: 48.4<br>2: 55.8 | 1: 48.4<br>2: 55.8 | 1: 48.4<br>2: 55.8 | 1: 48.4<br>2: 55.8 | 1: 48.4<br>2: 55.8 |
| 1.4 | 1: 61.3<br>2: 69.0 | 1: 61.3<br>2: 69.0 | 1: 61.3<br>2: 69.0 | 1: 45.4<br>2: 48.4 | 1: 45.4<br>2: 48.4 | 1: 45.4<br>2: 48.4 |
| 1.5 | 1: 48.4<br>2: 55.8 | 1: 58.5<br>2: 61.3 | 1: 58.5<br>2: 61.3 | 1: 45.4<br>2: 48.4 | 1: 45.4<br>2: 48.4 | 1: 45.4<br>2: 48.4 |
| 1.6 | 1: 48.4<br>2: 55.8 | 1: 48.4<br>2: 55.8 | 1: 48.4<br>2: 55.8 | 1: 61.3<br>2: 69.0 | 1: 61.3<br>2: 69.0 | 1: 61.3<br>2: 69.0 |

Example 2: Automised Physical Assessment of Liquified DATEM

In the automated detection of separation into a top and a bottom phase, approximately 140 ml of samples is transferred to a transparent rectangular plastic flasks (see FIG. 7) and 19 images were recorded (one image per wavelength) for each sample using a multispectral imaging system (VideometerLiq 2, Videometer A/S, Herlev, Denmark) exposing the samples to 265 nm, 405 nm, 430 nm, 450 nm, 470 nm, 490 nm, 515 nm, 540 nm, 570 nm, 590 nm, 630 nm, 645 nm, 660, 690 nm, 780 nm, 850 nm, 880 nm, 940 nm and 907 nm of uniform and diffuse front illumination. The images were combined into one RGB image for each sample and adjusted to the CIELAB Colour Space D65 Noon Daylight for reading the L-value (pixel value of zero=completely dark and 100=totally white). The pixel values are presented as graphs with pixel number as the first axis. Low pixel number at the top of the sample.

For evaluation of the phase separation line, the derivative is calculated. The calculation of the derivative at pixel number N is done in two steps:

1. The sum of the L-value for pixel number N to number N+9 minus the sum of the L-value for pixel number N-10 to N-1
2. The value from step 1 is then divided by 10

When the absolute value of the derivative is above a certain threshold value for both recordings of the sample within a span of maximum 100 pixels, it indicates that the sample has separated into a top and a bottom phase. If no interval of 100 pixels is found where the derivative has crossed the threshold, the sample is defined as homogeneous. The threshold values are dependent on the type of diluent:

Water as diluent: 2.0

Glycerol as diluent: 1.5

Blends of water and glycerol as diluents is calculated as the weighted average of the two values above First 50 pixels are disregarded as they indicate the difference between liquid and air. For the samples with glycerol, the last 250 pixels are disregarded since the signals are disturbed by the bottom of the flasks.

Six samples were prepared for the automised detection of separation into a top and a bottom phase. All six samples ate based on the DATEM sample 1.1. Three of the six samples are blends of DATEM and water: Sample 2.1 contains 20 w/w % water, sample 2.2 contains 50% water and sample 2.3 contains 70% water. The other three samples are blends of DATEM (sample 1.1) and glycerol. Sample 2.4 contains 40% glycerol, sample 2.5 contains 60% glycerol and sample 2.6 contains 80% glycerol.

Photos of the samples with water (2.1-2.3) is shown in FIG. 8. The subjective assessment of the photos are reflected in the data shown in FIG. 9, FIG. 10 and FIG. 11. The absolute values of the derivatives for sample 2.1 in FIG. 9 are not above 2.0 for both measurements in any 100 pixels interval and is defined homogeneous. Both sample 2.2 and 2.3 are assessed separated since the absolute values of the derivatives in both cases are higher than 2.0 in a 100 pixels interval: In FIG. 10 for sample 2.2 around pixel number 500, and in FIG. 11 for sample 2.3 around pixel number 1000.

Photos of the samples with glycerol (2.4-2.6) is shown in FIG. 12. The subjective assessment of the photos are reflected in the data shown in FIG. 13, FIG. 14 and FIG. 15. The absolute values of the derivatives for sample 2.4 in FIG. 13 are not above 1.5 for both measurements in any 100 pixels interval (disregarding top and bottom as defined) and is defined homogeneous. Both sample 2.5 and 2.6 are assessed separated since the absolute values of the derivatives in both cases are higher than 1.5 in a 100 pixels interval (disregarding top and bottom as defined): In FIG. 14 for sample 2.5 around pixel number 550, and in FIG. 15 for sample 2.6 around pixel number 1175.

Example 3: Viscosity of Liquified DATEM

Samples from example 1 were mixed with water or glycerol or a mixture of water and glycerol in a round bottom flask with agitation at 75 °C-85 °C and mechanical agitation.

The total volumes of the mixtures were 200 g-400 g for each blend. These blends were then characterised with their viscosity.

The viscosity was measured at a shear rate of 50 $s^{-1}$ during a temperature sweep from 90-20 °C or 50-20 °C with a cooling rate of 1 °C/min using Bob-cup measuring system CC 27, Serial number 17307, ISO3219 using 19 ml sample in Anton Paar Physica MC301 rheometer.

The samples were heated to the start measuring temperature, i.e. 90 or 50 °C, before transferred to the rheometer.

The results of the viscosity measurements are shown in FIG. 16 through FIG. 25.

The results in FIG. 16 and FIG. 17 show that an addition of 1% water to 99% DATEM (sample 1.1) reduces the viscosity from 10,000 Pa s at 30 °C to 3,000 Pa s and addition 2% water to 98% DATEM (sample 1.1) further reduces the viscosity to 1,000 Pa s. Similarly, the viscosity has dropped to <200 Pa s when a sample is prepared with 4% water. I.e. reductions to 30%, 10% and <2% of the viscosity of the pure DATEM sample. Similarly addition of 4% water to 96% DATEM (sample 1.2), see FIG. 18 and FIG. 19, reduces the viscosity from 20,000 Pa s to 100 Pa s at 40 °C, i.e. reduction to 0.5% of the initial viscosity. Further addition of water to 10% and 20% water content reduces the viscosity additionally in both cases, i.e. sample 1.1 and sample 1.2.

Qualitatively the same behaviour of the viscosity is observed when glycerol is used as diluent, however, the reduction levels are different. E.g. addition of 2%, 4% and 7% glycerol to sample 1.2 (FIG. 18 and FIG. 19) will reduce the viscosity at 40 °C from 20,000 in the pure DATEM to 10,000 Pa s, 3,000 Pa s and 2,000 Pa s respectively or relative reduction to 50%, 15% and 10% of the initial viscosity. FIG. 18 shows similar result for 4% glycerol in sample 1.1.

FIG. 19 shows a sample where a mixture of glycerol and water has been used as diluent (total composition is 80% DATEM sample 1.2, 10% water and 10% glycerol). The viscosity is at level with the viscosity of the sample with 10% water and 90% DATEM. The curve of the sample with water/glycerol diluent is uneven, however, the viscosity is in any case reduced significantly after adding the water/glycerol diluent to the DATEM.

The results in FIG. 20, FIG. 21, FIG. 22 and FIG. 23 confirm the results described above for sample 1.3, 1.4, 1.5 and 1.6 for 10% and 20% concentration of the diluent.

FIG. 24 and FIG. 25 show a less clear behaviour for the blends based on sample 1.7 and 1.8. These two DATEM samples have the highest content of saturated fatty acids, and one could speculate that the samples may partly solidify. Despite this, it is possible to create a sample with relatively regular viscosity curve for samples with either 10% water or 10% glycerol for both DATEM sample 1.7 (FIG. 24) and DATEM sample 1.8 (FIG. 25). This means that it is possible to prepare a sample of either of these DATEMs, which can be handled more easily due to the lower viscosity, despite irregularities in other cases, which may or may not be related to partly solidification of the samples.

All publications mentioned in the above specification are herein incorporated by reference. Various modifications and variations of the described methods and composition of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in chemistry applied in food industry or related fields are intended to be within the scope of the following claims.

The invention claimed is:

1. A liquid composition for preparation of a detergent composition comprising:

i) Diacetyl tartaric acid of monoglyceride (DATEM) ingredient in an amount of from 20 to 99% by weight, based on the total weight of the liquid composition, wherein the DATEM ingredient comprises DATEM compounds containing DATEM I or DATEM II or both;

ii) a diluent in an amount of from 1 to 80% by weight, based on the total weight of the liquid composition, wherein said diluent is selected from the group consisting of polar protic solvents and mixtures thereof; and iii) two or more of the following: surfactants, transferases, hydrolytic enzymes, oxido reductases, builders, bleaching agents, bleach activators, bluing agents, fluorescent dyes, caking inhibitors, masking agents, enzyme activators, antioxidants, and solubilizers, wherein:

a) the liquid composition is homogeneous, meaning that the liquid composition does not separate into a top phase and a bottom phase upon standing at a temperature between 20 °C and 40 °C for 24 hours;

b) has a viscosity of less than 1000 Pas at 25 °C;

c) a pH between 0.5 and 4.7; and d) the DATEM ingredient has an acid value in the range between 80 and 160.

2. The liquid composition, according to claim 1, wherein the combined amount of the DATEM and the diluent is least 90% by weight, based on the total weight of the liquid composition.

3. The liquid composition, according to claim 1, wherein the polar protic solvent is water, glycerol or mixtures thereof.

4. The liquid composition, according to claim 1, wherein the monoglycerides of DATEM are based on fatty acids having a chain length of C8 to C22.

5. The liquid composition, according to claim 1, wherein the monoglycerides of DATEM are based on saturated and/or unsaturated C12-C18 fatty acids.

6. The liquid composition, according to claim 1, wherein the DATEM is characterized by having been prepared from an acyl glyceride with minimum 80% by weight of mono acyl glyceride.

7. The liquid composition, according to claim 1, wherein the DATEM is characterized by having been prepared from a raw material with molar ratio of the tartaric acid to acyl glyceride of at least 0.8.

8. The liquid composition, according to claim 1, wherein the DATEM is not reacted with acetic acid anhydride.

9. The liquid composition, according to claim 1, wherein the liquid composition has a viscosity less than 50% of the viscosity of the pure DATEM.

10. The liquid composition, according to claim 1, wherein the DATEM ingredient has a saponification value in the range between 500-700.

11. The liquid composition, according to claim 1, wherein the diluent is water in an amount between 1% to 75%.

12. The liquid composition, according to claim 1, wherein the diluent is glycerol present in an amount between 1% and 80%.

13. The liquid composition, according to claim 1, wherein the diluent is a blend of glycerol and water in any ratio between glycerol and water in an amount between 1% to 75% of the total product.

14. A method of preparing a detergent composition, the method comprising:

(a) providing the liquid composition of claim 1; and (b) combining the liquid composition of claim 1 with one or more additional detergent adjunct materials selected form a surfactant, builder, bleach, bleach activator, bleach catalyst, enzyme, enzyme stabilizing system, chelant, optical brightener, soil release polymer, dye transfer agent, dispersant, suds suppressor, dye, perfume, colorant, filler salt, hydrotrope, photoactivator, fluorescer, fabric conditioner, hydrolyzable surfactant, preservative, anti-oxidant, anti-shrinkage agent, anti-wrinkle agent, germicide, fungicide, color speckles, silvercare, anti-tarnish agent, anti-corrosion agent, alkalinity source, solubilizing agent, carrier, processing aid, pigment or pH control agent for forming the detergent composition.

15. The liquid composition of claim 1, wherein the combined amount of DATEM ingredient and diluent is at least 90% by weight of the liquid composition.

16. The liquid composition of claim 1, wherein the combined amount of DATEM ingredient and diluent is at least 98% by weight of the liquid composition.

17. The liquid composition of claim 1, wherein the diluent is in an amount up to 40% by weight, based on the total weight of the liquid composition.

* * * * *